(12) United States Patent
Takahashi et al.

(10) Patent No.: US 11,056,766 B2
(45) Date of Patent: Jul. 6, 2021

(54) ANTENNA APPARATUS

(71) Applicant: PANASONIC INTELLECTUAL PROPERTY MANAGEMENT CO., LTD., Osaka (JP)

(72) Inventors: Ken Takahashi, Ishikawa (JP); Ryosuke Shiozaki, Tokyo (JP); Hiroshi Iwai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 35 days.

(21) Appl. No.: 16/559,179

(22) Filed: Sep. 3, 2019

(65) Prior Publication Data

US 2020/0076054 A1 Mar. 5, 2020

(30) Foreign Application Priority Data

Sep. 4, 2018 (JP) .............................. JP2018-165245

(51) Int. Cl.
*H01Q 1/32* (2006.01)
*H01Q 1/24* (2006.01)
*H01Q 1/42* (2006.01)
*G01S 13/08* (2006.01)

(52) U.S. Cl.
CPC .............. *H01Q 1/24* (2013.01); *G01S 13/08* (2013.01); *H01Q 1/325* (2013.01); *H01Q 1/3208* (2013.01); *H01Q 1/42* (2013.01)

(58) Field of Classification Search
CPC ...... H01Q 1/32; H01Q 1/3208; H01Q 1/3233; H01Q 1/325; H01Q 1/3283
See application file for complete search history.

(56) References Cited

U.S. PATENT DOCUMENTS

| | | | |
|---|---|---|---|
| 2009/0140911 A1 | 6/2009 | Kato et al. | |
| 2011/0279304 A1* | 11/2011 | Yonemoto | H01Q 1/3225 342/52 |
| 2014/0042325 A1* | 2/2014 | Yamamura | F21S 41/336 250/347 |

FOREIGN PATENT DOCUMENTS

| | | |
|---|---|---|
| EP | 0 498 524 A2 | 8/1992 |
| JP | 2009-103457 A | 5/2009 |

* cited by examiner

*Primary Examiner* — Seokjin Kim
(74) *Attorney, Agent, or Firm* — Greenblum & Bernstein, P.L.C.

(57) ABSTRACT

An antenna apparatus for transmitting and receiving electromagnetic waves via a cover member disposed outside, including: first and second antenna sections that are disposed adjacently to each other along a direction orthogonal to a predetermined direction to which the electromagnetic waves are transmitted and received and that transmit the electromagnetic waves, respectively; and first and second dielectric lenses that are disposed in the predetermined direction to which the first and second antenna sections transmit their electromagnetic waves and narrow beams of the electromagnetic waves transmitted by the first and second antennas, respectively, to transmit to the outside, in which an outer end face of first dielectric lens protrudes further forward in the predetermined direction than an outer end face of second dielectric lens.

11 Claims, 19 Drawing Sheets

ANTENNA APPARATUS

TECHNICAL FIELD

The present disclosure relates to an antenna apparatus.

BACKGROUND ART

Radar antenna apparatuses are known that detect the position of an object (hereinafter also referred to as "target") without contact using electromagnetic waves in frequency bands of millimeter waves and microwaves.

This type of antenna apparatus generally has a configuration in which the antenna apparatus is mounted in a cover member such as a bumper of a vehicle from a viewpoint of protection from an external flying object or a viewpoint of maintaining aesthetics of an object to be mounted (for example, a vehicle body), and transmits and receives electromagnetic waves via the cover member (for example, see PTL 1).

CITATION LIST

Patent Literature

PTL 1
Japanese Patent Application Laid-Open No. 2009-103457

SUMMARY

Technical Problem

High-frequency electromagnetic waves like millimeter waves generally have a property of passing through an insulator (for example, a resin material forming a bumper) but the transmittance of the electromagnetic waves changes according to the dielectric constant of the insulator, the thickness of the insulator, an incidence angle to the insulator, or the like. Therefore, part of electromagnetic waves transmitted by the antenna apparatus is reflected by an inner surface of the cover member, and may cause degradation in output characteristic or reception characteristic of the antenna apparatus.

FIG. 1 is a diagram illustrating behavior of an electromagnetic wave reflected by a cover member.

FIG. 1 shows a state in which part of electromagnetic wave F transmitted by antenna apparatus 100 is reflected by cover member B, and further the reflected wave is reflected again by a front end face of antenna apparatus 100 (for example, a front end face of a dielectric lens).

In such a state, a part (dashed line in FIG. 1) (hereinafter also referred to as "direct passage wave Fa") of electromagnetic wave F transmitted by antenna apparatus 100 is not reflected by cover member B and is transmitted to an external space in front of antenna apparatus 100, whereas the other part (alternate long and short dash line in FIG. 1) (hereinafter also referred to as "re-reflected wave Fb") is reflected by cover member B, then is reflected again by the front end face of antenna apparatus 100, and is transmitted to the external space in front of antenna apparatus 100. At this time, supposedly if the phase of direct passage wave Fa and the phase of re-reflected wave Fb are in opposite phase relationship, both cancel each other, and an output gain of antenna apparatus 100 decreases. Such a decrease in the output gain of antenna apparatus 100 may cause, for example, deterioration in detection performance of object detection.

With regard to this, distance between the front end face of antenna apparatus 100 and an inner surface of cover member B is set to, for example, distance that is an even multiple of $\lambda/4$ (where, $\lambda$ denotes a free space wavelength of the electromagnetic waves transmitted and received by antenna apparatus 100. Hereinafter, the same), thereby the phase of direct passage wave Fa and the phase of re-reflected wave Fb are made the same phase, and a state in which direct passage wave Fa is canceled by re-reflected wave Fb can be suppressed.

However, when antenna apparatus 100 is actually used, the distance between antenna apparatus 100 and cover member B changes due to vibration or the like of a vehicle equipped with antenna apparatus 100. Therefore, in antenna apparatus 100 according to the conventional art, even when antenna apparatus 100 is installed such that the distance between the front end face of antenna apparatus 100 and the inner surface of cover member B is set to the distance of an even multiple of $\lambda/4$, a decrease in the output gain of antenna apparatus 100 is an unavoidable problem due to vibration or the like of the vehicle.

The present disclosure has been made in view of the above-described problems, and an object thereof is to provide a more suitable antenna apparatus for transmitting and receiving electromagnetic waves via a cover member.

Solution to Problem

The present disclosure which primarily solves the problems mentioned above is an antenna apparatus for transmitting and receiving electromagnetic waves via a cover member disposed outside, the antenna apparatus including: first and second antenna sections that are disposed adjacently to each other along a direction orthogonal to a predetermined direction in which the electromagnetic waves are transmitted and that transmit the electromagnetic waves, respectively; first and second dielectric lenses that are disposed in front of the first and second antenna sections in the predetermined direction, respectively, and that narrow beams of the electromagnetic waves transmitted by the first and the second antenna sections, respectively, and transmit the beams of the electromagnetic waves to an outside, in which an outer end face of the first dielectric lens protrudes further forward in the predetermined direction than an outer end face of the second dielectric lens.

Advantageous Effects

The antenna apparatus according to the present disclosure can be suitably used for transmitting and receiving electromagnetic waves via the cover member.

DESCRIPTION OF EMBODIMENTS

Hereinafter, preferred embodiments of the present disclosure will be described in detail with reference to the accompanying drawings. In the present specification and accompanying drawings, components having substantially the same functions will be assigned the same reference signs and thereby redundant description will be omitted.

Embodiment 1

[Configuration of Antenna Apparatus]

Hereinafter, an example of the configuration of an antenna apparatus according to Embodiment 1 will be described with reference to FIGS. 2-8. Note that the antenna apparatus according to the present embodiment is applied to a radar device mounted on a vehicle.

In order to clarify positional relationship of configurations, the accompanying drawings show a common orthogonal coordinate system (X, Y, Z) on the basis of a forward direction (that is, a target direction of object detection) to which the antenna apparatus transmits an electromagnetic wave to the outside of its own antenna apparatus (hereinafter referred to as "apparatus outside"). In the following, description will be made assuming that a plus direction of the X axis represents the forward direction to which the antenna apparatus transmits an electromagnetic wave to the apparatus outside (hereinafter abbreviated as "forward direction"), a plus direction of the Y axis represents a lateral left direction of the antenna apparatus, and a plus direction of the Z axis represents an upward direction of the antenna apparatus (hereinafter abbreviated as "upward direction").

Figure 2:
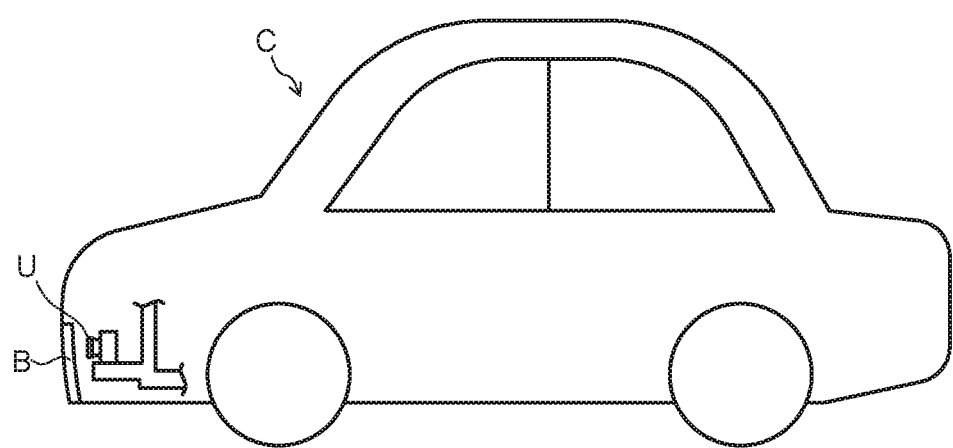
FIG. 2 illustrates a state in which an antenna apparatus according to Embodiment 1 is mounted in the cover member.

FIG. 2 illustrates a state in which antenna apparatus U according to the present embodiment is mounted in cover member B (here, a bumper member of vehicle C).

Antenna apparatus U according to the embodiment is attached to, for example, cover member B of vehicle C, and transmits and receives electromagnetic waves via cover member B.

Cover member B has, for example, a thin plate shape extending in a direction vertical to the ground as shown in FIG. 2. FIG. 2 shows a state in which the plus Z direction of antenna apparatus U faces an upward direction (direction vertical to the ground) of vehicle C, and the plus X direction of antenna apparatus U faces a traveling direction (direction horizontal to the ground) of vehicle C.

Figure 3:
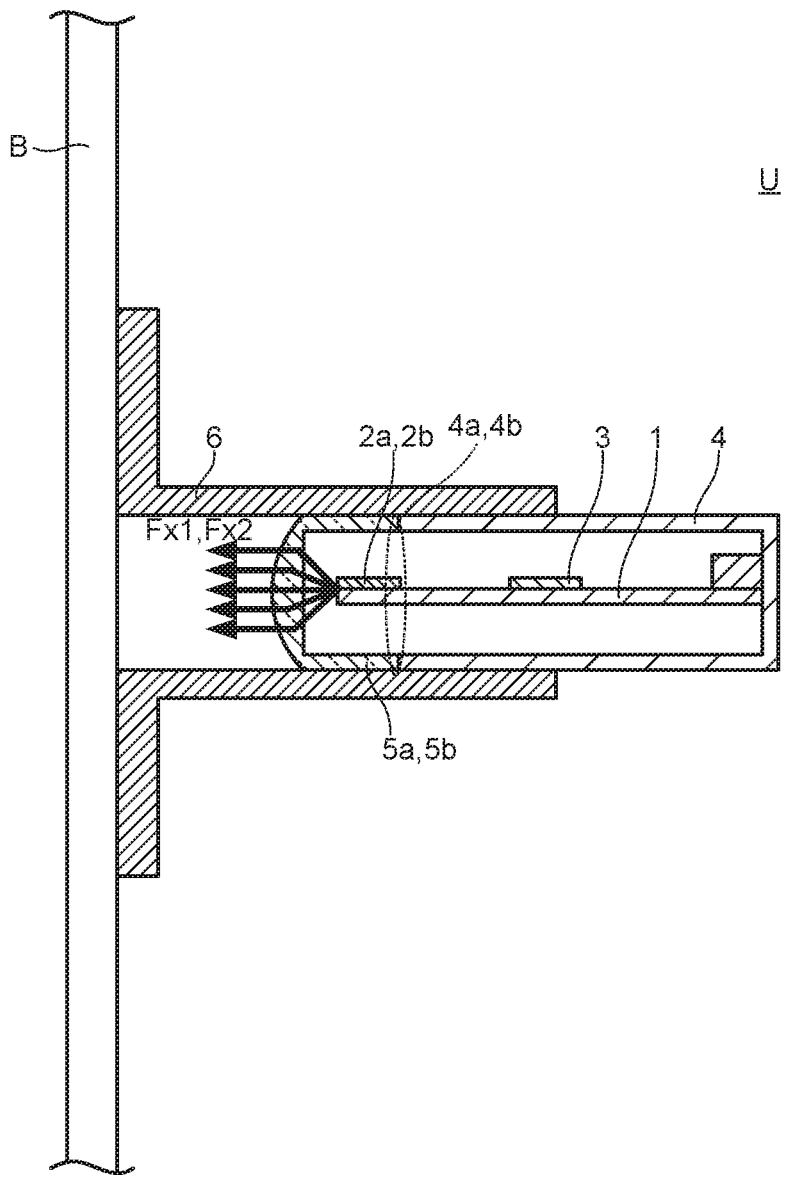
FIG. 3 is a side sectional view illustrating a configuration of the antenna apparatus according to Embodiment 1.
Figure 3:
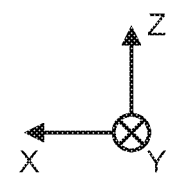
Figure 4:
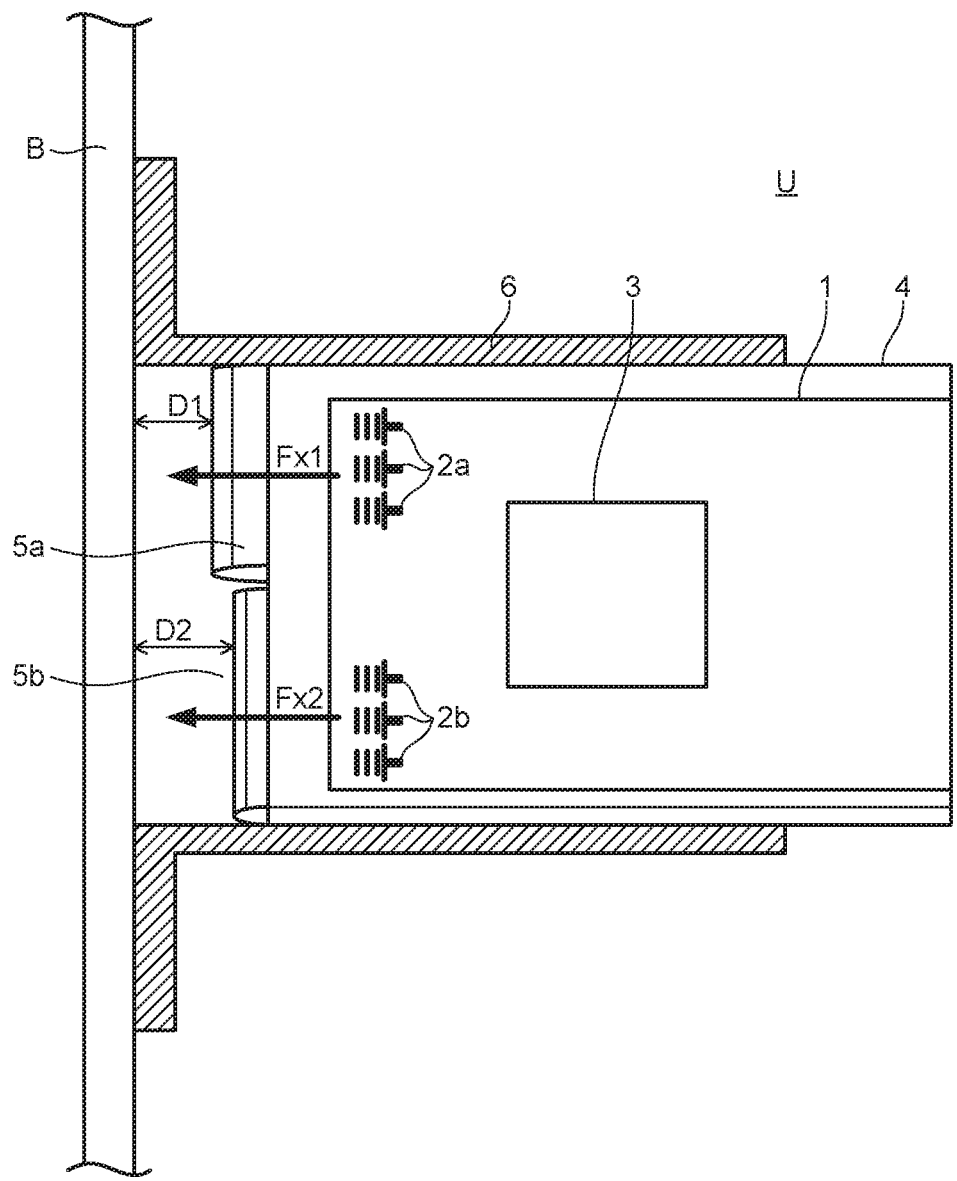
FIG. 4 is a plan view of the antenna apparatus according to Embodiment 1.
Figure 5:
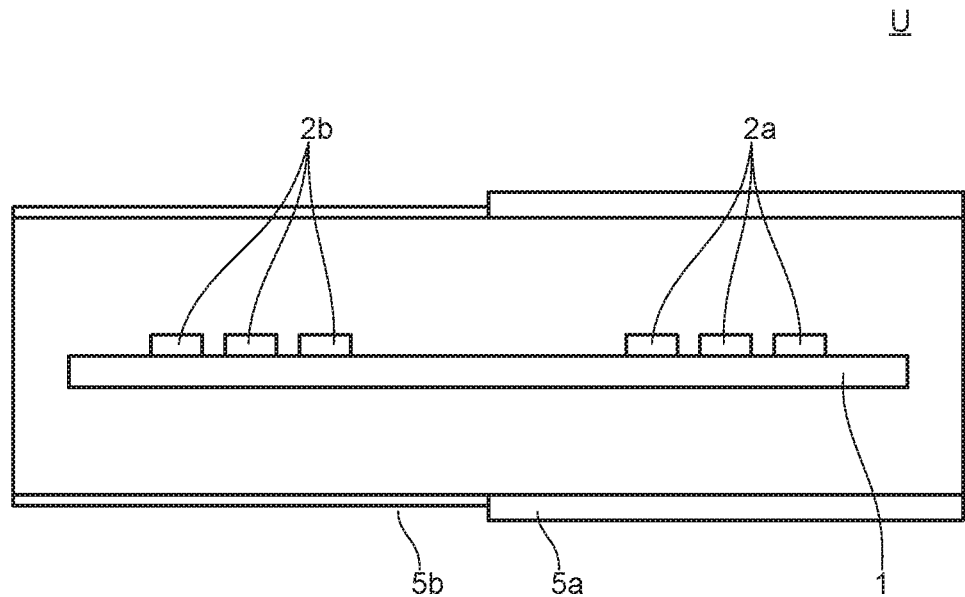
FIG. 5 is a diagram of the antenna apparatus according to Embodiment 1 as viewed from the back.
Figure 5:
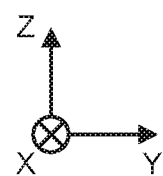

FIG. 3 is a side sectional view illustrating a configuration of antenna apparatus U according to the present embodiment. FIG. 4 is a plan view of antenna apparatus U according to the embodiment. FIG. 5 is a diagram of antenna apparatus U according to the embodiment as viewed from the back.

Antenna apparatus U according to the embodiment includes circuit board 1, first antenna section 2a, second antenna section 2b, signal processing IC 3, housing 4, first dielectric lens 5a, second dielectric lens 5b, and bracket 6.

Circuit board 1 is a board on which first antenna section 2a, second antenna section 2b, signal processing IC 3, and the like are mounted. In a board surface of circuit board 1, first antenna section 2a, second antenna section 2b, signal processing IC 3, and the like are mounted, and wiring (not shown) for electrically connecting the components is formed in a pattern.

Circuit board 1 is disposed such that an extending direction of the board surface is parallel to a front-rear direction. In other words, circuit board 1 is disposed such that the extending direction of the board surface intersects with the extending direction of cover member B (here, approximately ±Z direction).

The configuration of circuit board 1 is not particularly limited in the invention, and as circuit board 1, for example, a PCB (Printed Circuit Board), multilayer board, or a semiconductor board with built-in signal processing IC 3 is used.

First antenna section 2a is disposed in circuit board 1 and transmits electromagnetic wave Fx1 forward. In addition, first antenna section 2a receives reflected waves from forward which are electromagnetic waves Fx1 and Fx2 transmitted by first antenna section 2a and second antenna section 2b and reflected and returned by a target.

Second antenna section 2b is disposed adjacently in the minus Y direction side to first antenna section 2a in circuit board 1, and transmits electromagnetic wave Fx2 forward. In addition, second antenna section 2b receives the reflected waves from forward which are electromagnetic waves Fx1 and Fx2 transmitted by first antenna section 2a and second antenna section 2b and reflected and returned by the target.

As first antenna section 2a and second antenna section 2b, for example, an end-fire array antenna having directivity in the direction of the board surface of circuit board 1 is applied. Then, first antenna section 2a and second antenna section 2b are disposed in a front area of circuit board 1, transmit electromagnetic waves Fx1 and Fx2 toward the direction of a front end side of circuit board 1 and in parallel with the board surface of circuit board 1, and receive reflected waves from the direction of the front end side of circuit board 1 in parallel with the board surface of circuit board 1. The end-fire array antenna includes a plurality of strip conductors disposed such that their longitudinal directions are parallel to each other, and transmits and receives electromagnetic waves along a direction in which the strip conductors are disposed.

First antenna section 2a is composed of, for example, three end-fire array antennas (hereinafter also referred to as "antenna elements") disposed adjacently along the ±Y direction. In the same manner, second antenna section 2b is composed of three end-fire array antennas disposed adjacently along the ±Y direction. Then, first antenna section 2a and second antenna section 2b are each configured as a phased array antenna by the plurality of antenna elements disposed adjacently along the ±Y direction.

First antenna section 2a and second antenna section 2b are typically configured to execute the same operation. That is, first antenna section 2a and second antenna section 2b transmit electromagnetic waves Fx1 and Fx2 having the same frequency and the same phase to the front of the apparatus outside. In addition, first antenna section 2a and second antenna section 2b receive reflected waves which are electromagnetic waves Fx1 and Fx2 reflected and returned by the target.

Signal processing IC 3 transmits a drive signal of a high frequency (for example, a millimeter wave frequency band) to first antenna section 2a and second antenna section 2b and causes first antenna section 2a and second antenna section 2b to transmit electromagnetic waves Fx1 and Fx2 (for example, pulse compression electromagnetic waves composed of pulse sequences or frequency-modulated continuous electromagnetic waves).

Signal processing IC 3 acquires a reception signal related to the reflected waves from each of first antenna section 2a and second antenna section 2b, performs object detection processing (for example, detection processing and frequency analysis processing) on the reception signal, and detects distance to the target (for example, a vehicle or person), a direction in which the target exists, and in addition, reflection intensity, speed, and the like of the target.

Signal processing IC 3 estimates the direction of the target by a method, for example, for scanning the transmission directions of electromagnetic waves Fx1 and Fx2 transmitted from the antenna sections (first antenna section 2a and second antenna section 2b) or detecting reception phase difference between reflected wave signals received by the respective antenna elements disposed in an array of the antenna sections (first antenna section 2a and second antenna section 2b).

Since processing performed by signal processing IC 3 is the same as a known configuration, detailed description thereof is omitted here. Signal processing IC 3 is mainly composed of a known microcomputer comprised of, for example, a CPU, ROM, and RAM, and in addition to that, includes a drive circuit for generating a high-frequency drive signal to be transmitted to first antenna section 2a and second antenna section 2b, a detection circuit for performing reception processing on reflected wave signals from first antenna section 2a and second antenna section 2b, and the like. However, it goes without saying that part of signal processing IC 3 can be implemented by only a dedicated hardware circuit having no CPU or the like.

Housing 4 houses circuit board 1 and supports first dielectric lens 5a and second dielectric lens 5b in front of circuit board 1. Housing 4 houses circuit board 1 typically in a substantially sealed state.

Window portions 4a and 4b through which first antenna section 2a and second antenna section 2b transmit and receive electromagnetic waves respectively are formed on a front surface of housing 4, and first dielectric lens 5a and second dielectric lens 5b are attached to window portions 4a and 4b (see FIG. 3).

As a raw material of housing 4, for example, a metal material or resin material is used. When the resin material is used for housing 4, a product integrally formed of the same resin material may be used for housing 4 and the dielectric lens (first dielectric lens 5a or second dielectric lens 5b).

First dielectric lens 5a is supported in front of first antenna section 2a, narrows a beam of electromagnetic wave Fx1 transmitted by first antenna section 2a, and transmits to a front area of the apparatus outside. Then, first dielectric lens 5a focuses the reflected waves which are electromagnetic waves Fx1 and Fx2 transmitted to the apparatus outside and reflected and returned by the target on first antenna section 2a.

Second dielectric lens 5b is supported in front of second antenna section 2b, narrows a beam of electromagnetic wave Fx2 transmitted by second antenna section 2b, and transmits to the front area of the apparatus outside. Then, second dielectric lens 5b focuses the reflected waves which are electromagnetic waves Fx1 and Fx2 transmitted to the apparatus outside and reflected and returned by the target on second antenna section 2b.

A front end face of first dielectric lens 5a (corresponding to an "outer end face" of the invention) and a front end face of second dielectric lens 5b (corresponding to the "outer end face" of the invention) both face cover member B. In other words, antenna apparatus U is attached to cover member B so that a direction (±Y direction) in which first antenna section 2a and second antenna section 2b are adjacent to each other is parallel to the extending direction of cover member B.

As first dielectric lens 5a and second dielectric lens 5b, for example, a semi-cylindrical or parabolic cylindrical lens having a convex shape in the plus X direction and extending along the ±Y direction is used. The semi-cylindrical or parabolic cylindrical lens has substantially the same side sectional shape (also referred to as semicircular cylindrical shape. Hereinafter, it is generically referred to as semi-cylindrical lens) at any position in the ±Y direction. Therefore, when electromagnetic waves transmitted from the plurality of antenna elements disposed along the ±Y direction are reflected by the target and arrive at the antenna elements, the electromagnetic waves can be prevented from turning to directivity directions different from each other (the same applies to first antenna section 2a or second antenna section 2b). Hereby, it is possible to suppress deterioration in accuracy of object detection due to mutual interference or a change in phase difference.

The front end face of first dielectric lens 5a protrudes further forward than the front end face of second dielectric lens 5b (see FIG. 4). In other words, distance D1 between the front end face of first dielectric lens 5a and an inner surface of cover member B (hereinafter referred to as "first inter-end face distance") is shorter than distance D2 between the front end face of second dielectric lens 5b and the inner surface of cover member B (hereinafter referred to as "second inter-end face distance").

Difference between a forward protrusion amount of the front end face of first dielectric lens 5a and a forward protrusion amount of the front end face of second dielectric lens 5b is typically set to approximately $\lambda/4\times(2m-1)$, where $\lambda$ denotes a free space wavelength of electromagnetic waves Fx1 and Fx2, and m denotes an arbitrary positive integer. In other words, the difference between first inter-end face distance D1 and second inter-end face distance D2 is set to approximately $\lambda/4\times(2m-1)$, where $\lambda$ denotes a free space wavelength of electromagnetic waves Fx1 and Fx2, and m denotes an arbitrary positive integer. Here, "approximately" means to include a tolerance range (for example, around 1 mm) due to a manufacturing error (hereinafter the same).

Adjustment of the difference between the forward protrusion amount of the front end face of first dielectric lens 5a and the forward protrusion amount of the front end face of second dielectric lens 5b is performed by adjusting, for example, the thickness of lens of each of first dielectric lens 5a and second dielectric lens 5b, disposed positions, relative dielectric constants, or aperture diameters.

Figure 6:
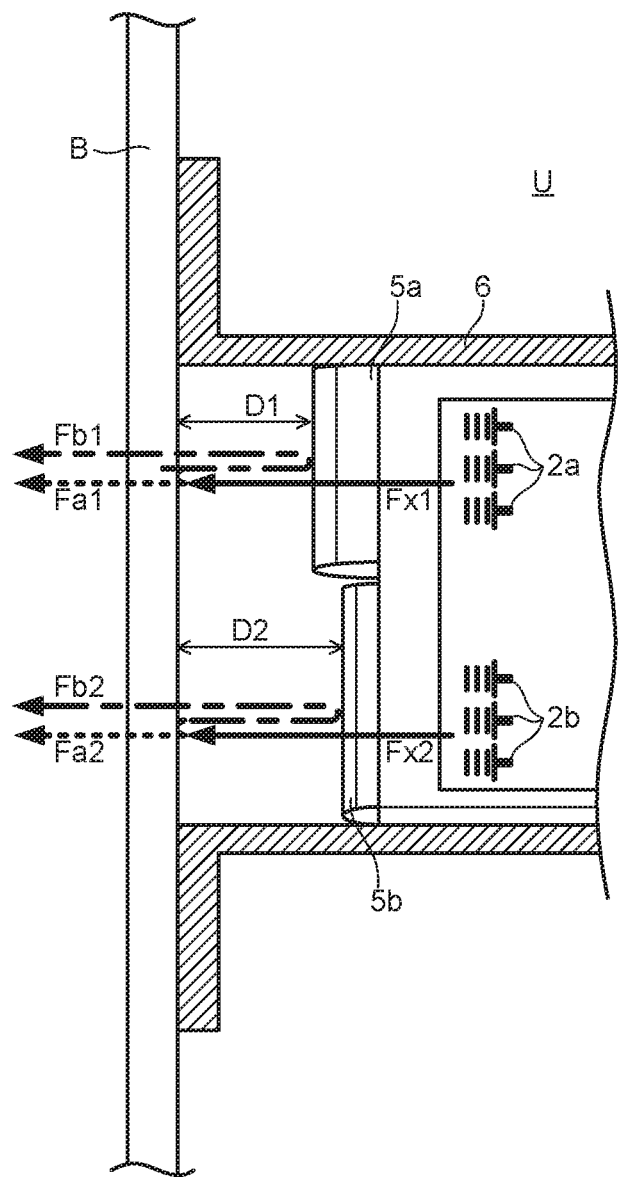
FIG. 6 illustrates behavior of electromagnetic waves when the antenna apparatus according to Embodiment 1 operates.
Figure 6:
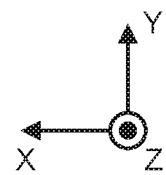

Hereby, it is possible to cause "a re-reflected wave generated when electromagnetic wave Fx1 transmitted from first antenna section 2a is reflected by cover member B, is reflected again by first dielectric lens 5a, and travels to the apparatus outside" and "a re-reflected wave generated when electromagnetic wave Fx2 transmitted from second antenna section 2b is reflected by cover member B, is reflected again by second dielectric lens 5b, and travels to the apparatus outside" to act to cancel each other (to be described later with reference to FIG. 6).

For example, in order not to make the phase of the direct passage wave and the phase of the re-reflected wave in the opposite phase relationship when electromagnetic waves Fx1 and Fx2 are transmitted, first inter-end face distance D1 and second inter-end face distance D2 are set to satisfy following expressions 1 and 2 respectively:

$$\lambda/4\times 2i-\beta<D1<\lambda/4\times 2+\beta \quad \text{(Expression 1); and}$$

$$\lambda/4\times 2j-\beta<D2<\lambda/4\times 2j+\beta \quad \text{(Expression 2),}$$

where i and j denote any positive integers and $\beta$ denotes a margin distance of $\lambda/8$.

Raw materials forming first dielectric lens 5a and second dielectric lens 5b may be arbitrary, and for example, acrylic resin, tetrafluoroethylene resin, polystyrene resin, polycarbonate resin, polybutylene terephthalate resin, polyphenylene resin, polypropylene resin, syndiotactic polystyrene resin, or ABS resin is used.

Bracket 6 holds housing 4 and fixes housing 4 to cover member B in a front area of housing 4. Bracket 6 fixes housing 4 to cover member B, for example, using a fixing member such as a double-sided tape or bolt.

Bracket 6 fixes housing 4 to cover member B so that, for example, transmission directions of electromagnetic waves Fx1 and Fx2 are a direction horizontal to the ground.

[Behavior of Electromagnetic Wave when Antenna Apparatus Operates]

Next, behavior of electromagnetic waves when antenna apparatus U according to the present embodiment operates will be described with reference to FIGS. 6 and 7.

FIG. 6 illustrates behavior of electromagnetic waves when antenna apparatus U according to the present embodiment operates.

Figure 7:
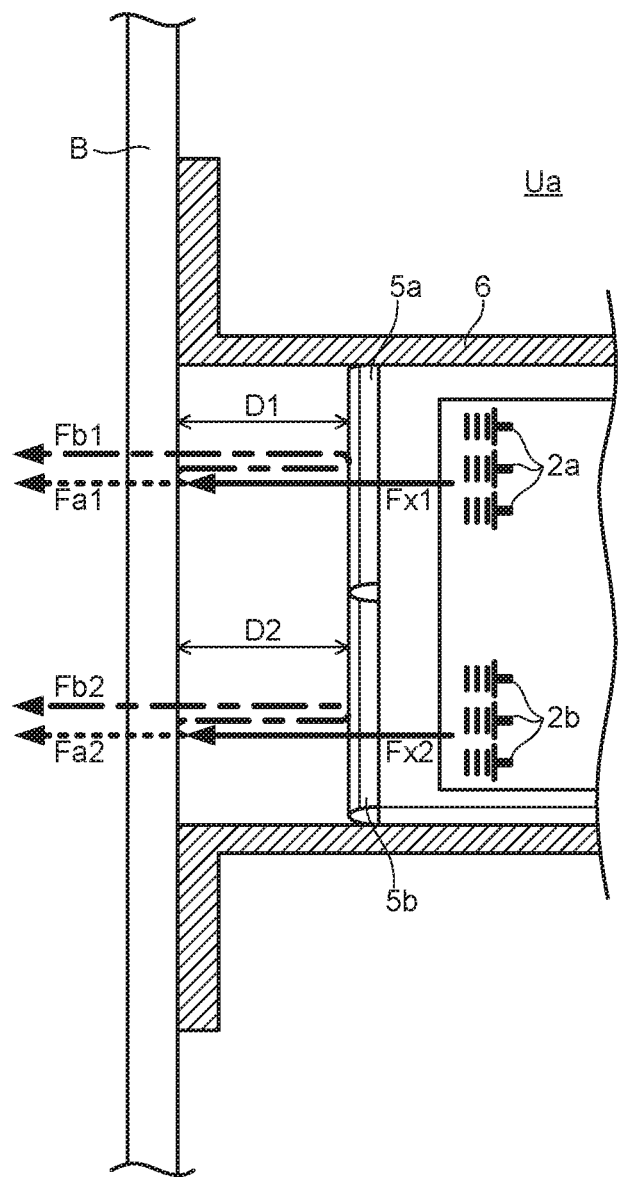
FIG. 7 illustrates behavior of electromagnetic waves when an antenna apparatus according to a comparison example operates.
Figure 7:
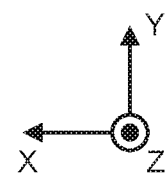

FIG. 7 illustrates behavior of electromagnetic waves when antenna apparatus Ua according to a comparison example operates. Antenna apparatus Ua according to the comparison example is different from antenna apparatus U according to the present embodiment in that first inter-end face distance D1 and second inter-end face distance D2 are the same.

As shown in FIGS. 6 and 7, in antenna apparatuses U and Ua, electromagnetic wave Fx1 transmitted forward from first antenna section 2a and electromagnetic wave Fx2 transmitted forward from second antenna section 2b reach cover member B in substantially the same phase.

At this time, most Fa1 (hereinafter referred to as "direct passage wave Fa1") of electromagnetic wave Fx1 transmitted from first antenna section 2a passes through cover member B as it is, but part Fb1 (hereinafter referred to as "re-reflected wave Fb1") of electromagnetic wave Fx1 is reflected by cover member B, then returns to first dielectric lens 5a side, is reflected again by first dielectric lens 5a, and is transmitted to the apparatus outside.

In addition, most Fa2 (hereinafter referred to as "direct passage wave Fa2") of electromagnetic wave Fx2 transmitted from second antenna section 2b passes through cover member B as it is, but part Fb2 (hereinafter referred to as "re-reflected wave Fb2") of electromagnetic wave Fx2 is reflected by cover member B, then returns to second dielectric lens 5b side, is reflected again by second dielectric lens 5b, and is transmitted to the apparatus outside.

Supposing that the distances (first inter-end face distance D1 and second inter-end face distance D2) between the front end faces of antenna apparatuses U and Ua and the inner surface of cover member B are set such that direct passage waves Fa1 and Fa2 and re-reflected waves Fb1 and Fb2 are the same phase, influence of re-reflected waves Fb1 and Fb2 on the output gains of antenna apparatuses U and Ua is small. However, actually the distances between antenna apparatuses U and Ua and cover member B change due to vibration or the like of the vehicles equipped with antenna apparatuses U and Ua.

Figure 1:
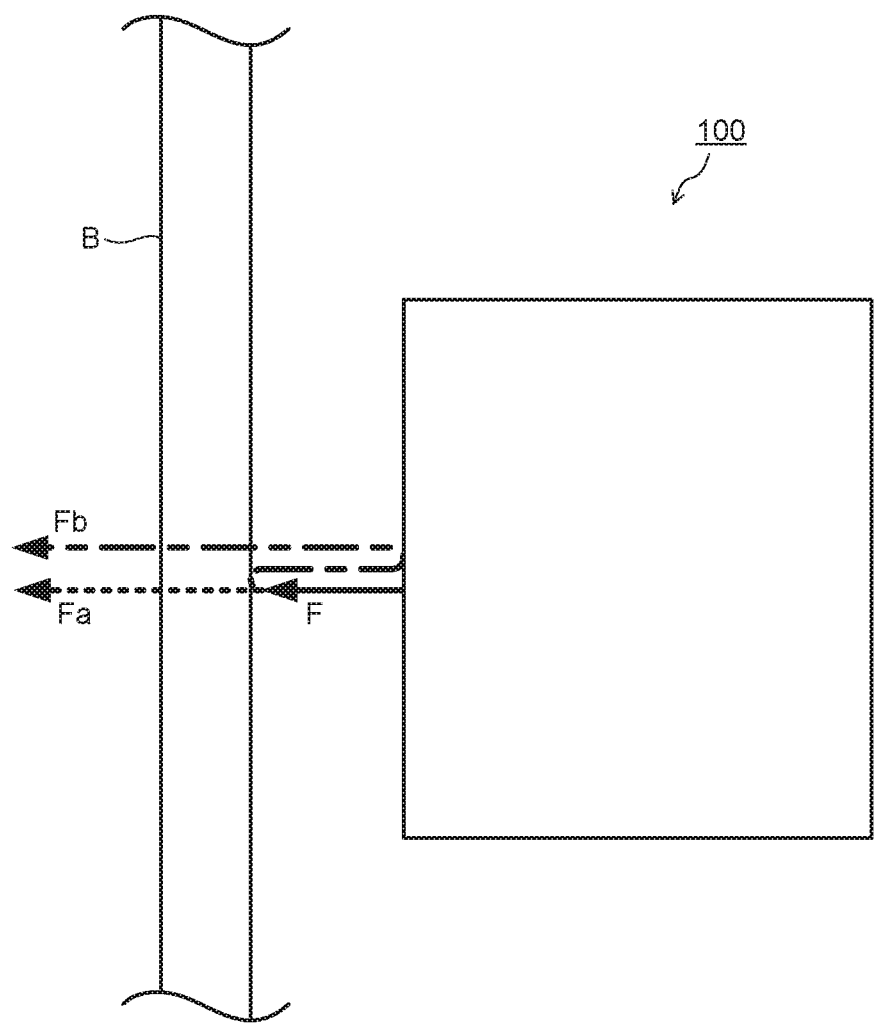
FIG. 1 is a diagram illustrating behavior of an electromagnetic wave reflected by a cover member.

At this time, as shown in antenna apparatus Ua according to the comparison example (see FIG. 7), if first inter-end face distance D1 and second inter-end face distance D2 are the same, as described above with reference to FIG. 1, re-reflected waves Fb1 and Fb2 act to cancel direct passage waves Fa1 and Fa2, and causes a decrease in the output gain of antenna apparatus Ua.

In this regard, in antenna apparatus U according to the embodiment, the difference between first inter-end face distance D1 and second inter-end face distance D2 is set to approximately $\lambda/4\times(2m-1)$. Therefore, the phase of re-reflected wave Fb1 generated due to electromagnetic wave Fx1 transmitted from first antenna section 2a and the phase of re-reflected wave Fb2 generated due to electromagnetic wave Fx2 transmitted from second antenna section 2b are in the opposite phase relationship and cancel each other. As a result, in antenna apparatus U according to the embodiment, the degree of re-reflected waves Fb1 and Fb2 superposing on direct passage waves Fa1 and Fa2 can be reduced. Thereby, it is possible to suppress the situation in which the output gains of electromagnetic waves Fx1 and Fx2 are reduced due to the positional displacement of antenna apparatus U.

Figure 8:
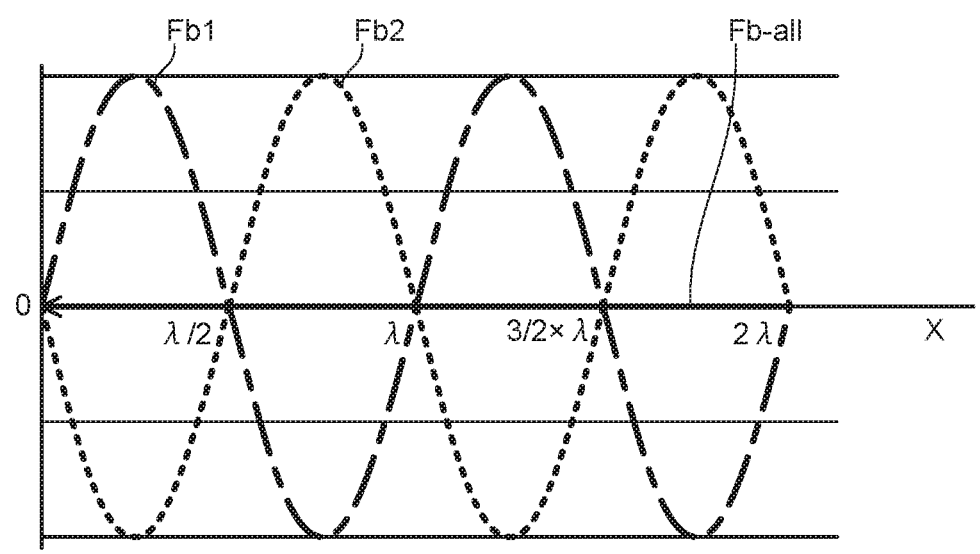
FIG. 8 is a graph showing amplitudes of re-reflected waves Fb1 and Fb2 in the antenna apparatus according to Embodiment 1 with respect to the position of the antenna apparatus.

FIG. 8 is a graph showing amplitudes of re-reflected waves Fb1 and Fb2 in antenna apparatus U according to the present embodiment with respect to the position of antenna apparatus U. In FIG. 8, the horizontal axis represents the position of antenna apparatus U from cover member B, and the vertical axis represents an amplitude of re-reflected wave Fb1 generated due to electromagnetic wave Fx1 transmitted from first antenna section 2a, an amplitude of re-reflected wave Fb2 generated due to electromagnetic wave Fx2 transmitted from second antenna section 2b, and an amplitude of combined component Fb-all of re-reflected wave Fb1 and re-reflected wave Fb2.

As can be seen from FIG. 8, in antenna apparatus U according to the embodiment, because the difference between first inter-end face distance D1 and second inter-end face distance D2 is set to approximately $\lambda/4 \times (2m-1)$ (see above expression 1), re-reflected wave Fb1 and re-reflected wave Fb2 are in the opposite phase relationship regardless of the position of antenna apparatus U. Therefore, combined component Fb-all of re-reflected wave Fb1 and re-reflected wave Fb2 becomes zero regardless of the position of antenna apparatus U.

Even if the difference between first inter-end face distance D1 and second inter-end face distance D2 is not completely equal to approximately $\lambda/4 \times (2m-1)$, if first inter-end face distance D1 and second inter-end face distance D2 are different from each other, it is possible to cause re-reflected wave Fb1 and re-reflected wave Fb2 to act to weaken each other, and it is possible to reduce the degree of re-reflected waves Fb1 and Fb2 superposing on direct passage waves Fa1 and Fa2 in comparison with the case where first inter-end face distance D1 and second inter-end face distance D2 are the same.

By setting first inter-end face distance D1 and second inter-end face distance D2 to be different from each other, either first antenna section 2a or second antenna section 2b can secure a high output gain and reception gain, and thereby robustness with respect to the positional displacement of antenna apparatus U is improved.

Figure 9A:
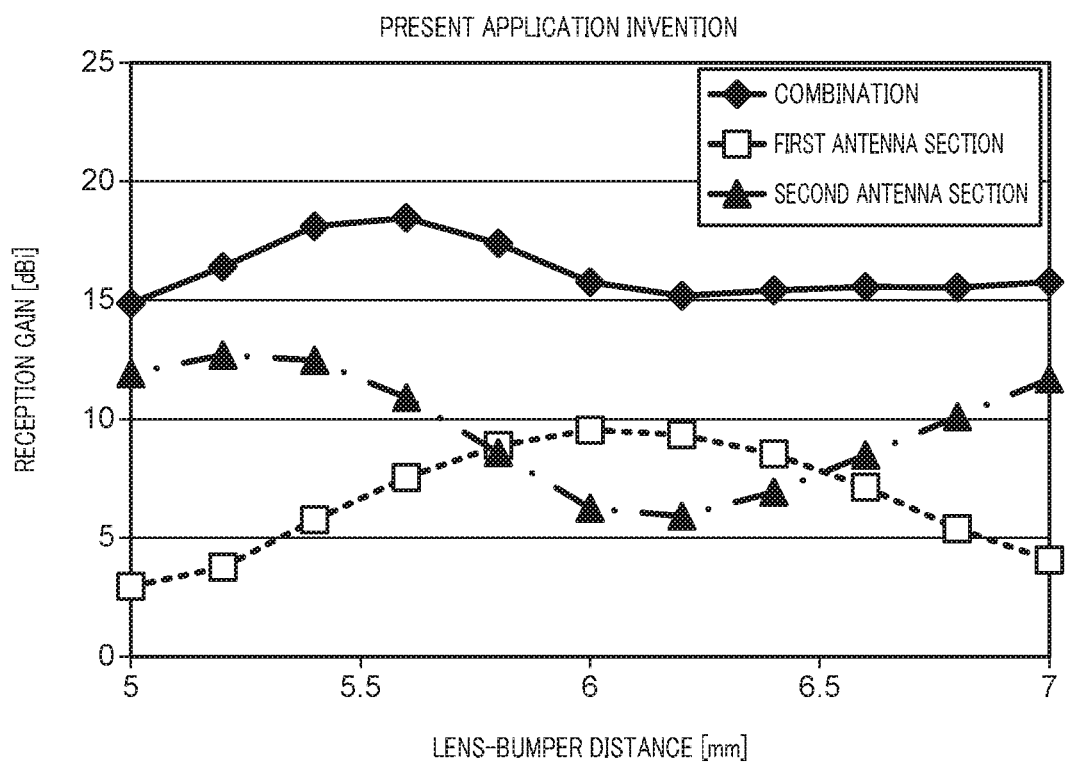
FIG. 9A illustrates a simulation result of verifying radar performance of the antenna apparatus according to Embodiment 1.
Figure 9B:
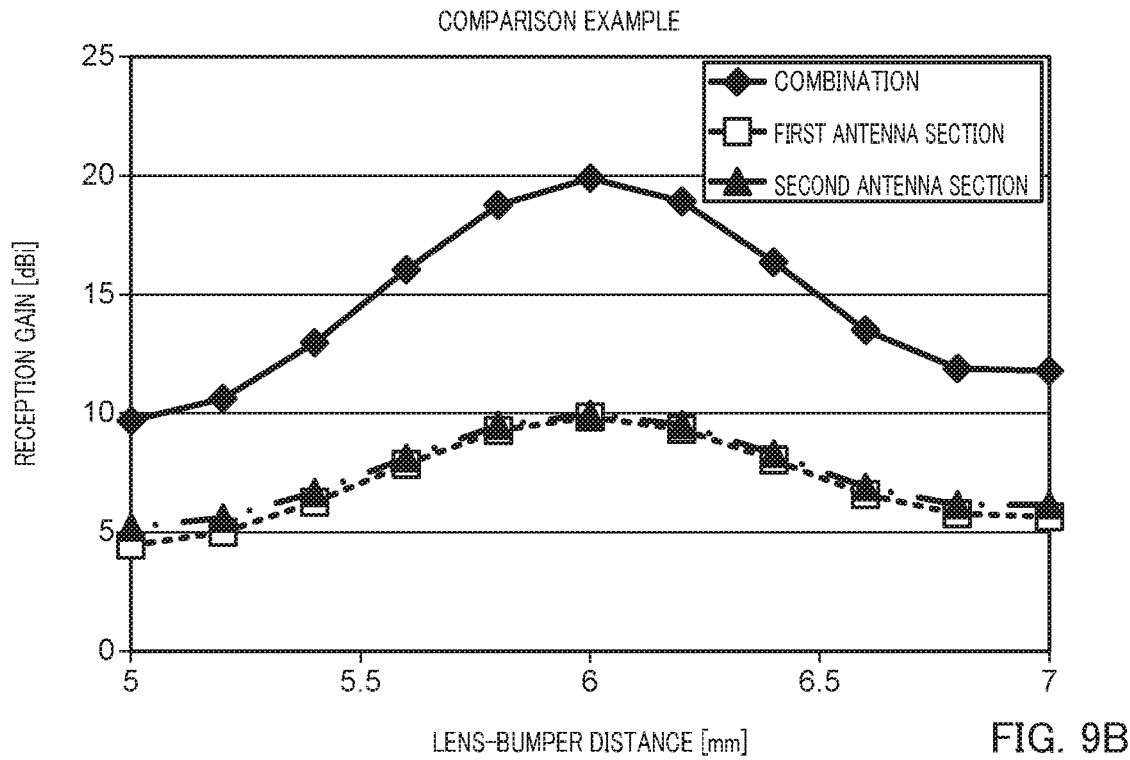
FIG. 9B illustrates a simulation result of verifying radar performance of the antenna apparatus according to the comparison example.

FIGS. 9A and 9B illustrate simulation results of verifying radar performance of antenna apparatus U according to the present embodiment and antenna apparatus Ua according to the comparison example.

In the simulation, first antenna section 2a and second antenna section 2b each transmit an electromagnetic wave, and radio wave intensity (that is, reception gain) of reflection waves from a predetermined target received at each of first antenna section 2a and second antenna section 2b is calculated. In the simulation, the reception gain is calculated for each distance between cover member B and antenna apparatuses U and Ua while changing the distances between the inner surface of cover member B and the front end faces of antenna apparatuses U and Ua (that is, first inter-end face distance D1 and second inter-end face distance D2). Plots of simulation results are connected to draw the graph lines.

The lines of FIG. 9A show the simulation results of antenna apparatus U according to the embodiment, and represent the following:

dashed line: the reception gain at first antenna section 2a;

alternate long and short dash line: the reception gain at second antenna section 2b; and solid line: the sum of the reception gain at first antenna section 2a and the reception gain at second antenna section 2b.

The lines of FIG. 9B show the simulation results of antenna apparatus Ua according to the comparison example, and represent the following:

dashed line: the reception gain at first antenna section 2a;

alternate long and short dash line: the reception gain at second antenna section 2b; and solid line: the sum of the reception gain at first antenna section 2a and the reception gain at second antenna section 2b.

As can be seen from FIG. 9B, in antenna apparatus Ua according to the comparison example, an area where radio wave intensity weakens (position at 5 mm and position at 7 mm in FIG. 9B) appears at a plurality of positions according to the distance between cover member B and the front end face of antenna apparatus Ua. That is, in antenna apparatus Ua according to the comparison example, the output gain of antenna apparatus Ua is decreased due to a slight positional displacement of antenna apparatus Ua, and as a result, the reception gain at antenna apparatus Ua is decreased. That is, in antenna apparatus Ua according to the comparison example, the accuracy of object detection is excessively deteriorated due to the positional displacement of antenna apparatus Ua.

On the other hand, as can be seen from FIG. 9A, in antenna apparatus U according to the embodiment, even if the distance between cover member B and the front end face of antenna apparatus U is changed, the sum of the reception gain of first antenna section 2a and the reception gain of second antenna section 2b is substantially a constant reception gain (solid line in FIG. 9A). That is, antenna apparatus U according to the embodiment can suppress the situation in which the accuracy of object detection is excessively deteriorated even if antenna apparatus U is displaced, unlike antenna apparatus Ua according to the comparison example.

[Effects]

As described above, antenna apparatus U according to the embodiment includes first and second antenna sections 2a and 2b that are disposed adjacently along the direction orthogonal to the front and transmit electromagnetic waves Fx1 and Fx2 forward, respectively, and first and second dielectric lenses 5a and 5b that are disposed in front of first and second antenna sections 2a and 2b, respectively, and narrow the beams of electromagnetic waves Fx1 and Fx2 transmitted by first and second antenna sections 2a and 2b, respectively, to transmit to the apparatus outside, wherein the front end face (outer end face) of first dielectric lens 5a protrudes further forward than the front end face (outer end face) of second dielectric lens 5b.

Thus, according to antenna apparatus U according to the embodiment, when electromagnetic waves Fx1 and Fx2 are transmitted to the apparatus outside, it is possible to cause "re-reflected wave Fb1 generated when electromagnetic wave Fx1 transmitted from first antenna section 2a is reflected by cover member B, is reflected again by first dielectric lens 5a, and travels to the apparatus outside" and "re-reflected wave Fb2 generated when electromagnetic wave Fx2 transmitted from second antenna section 2b is reflected by cover member B, is reflected again by second dielectric lens 5b, and travels to the apparatus outside" to act to cancel each other. Thereby, even if the distance between antenna apparatus U and cover member B changes due to vibration during traveling or the like, it is possible to suppress the situation in which the output gain and reception gain are decreased due to above-described re-reflected waves Fb1 and Fb2.

Especially, in antenna apparatus U according to the embodiment, the difference between the forward protrusion amount of the front end face of first dielectric lens 5a and the forward protrusion amount of the front end face of second dielectric lens 5b (or the difference between the distance between the front end face of first dielectric lens 5a and cover member B and the distance between the front end face of second dielectric lens 5b and cover member B) is set to approximately $\lambda/4\times(2m-1)$. This allows re-reflected wave Fb1 and re-reflected wave Fb2 to act to cancel each other more effectively.

Embodiment 2

Next, antenna apparatus U according to Embodiment 2 will be described with reference to FIGS. 10 to 12. Antenna apparatus U according to the present invention is different from Embodiment 1 in configurations of first dielectric lens 5a and second dielectric lens 5b. Description of configurations common to Embodiment 1 will be omitted (hereinafter, the same applies to other embodiments).

Figure 10:
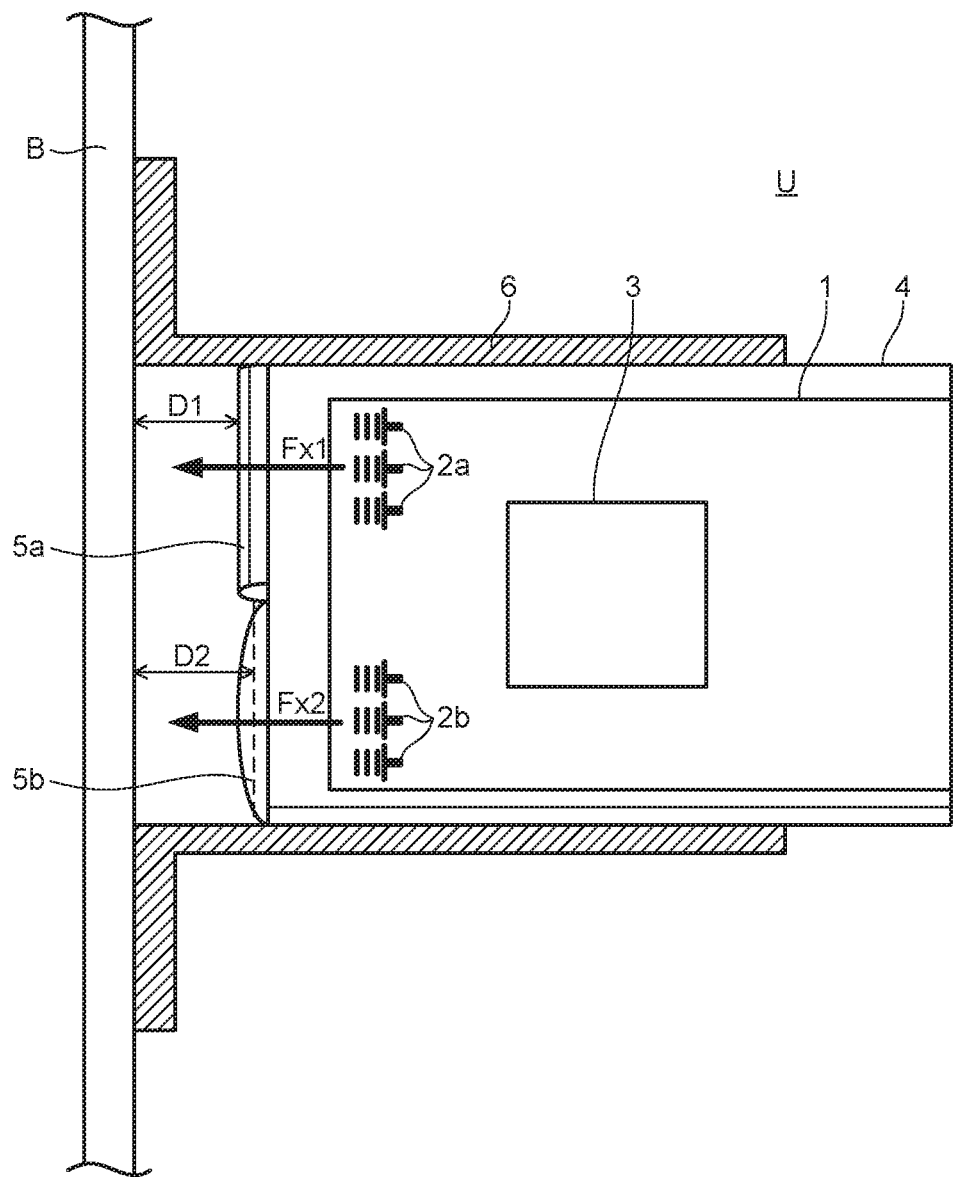
FIG. 10 is a plan view of an antenna apparatus according to Embodiment 2.
Figure 11:
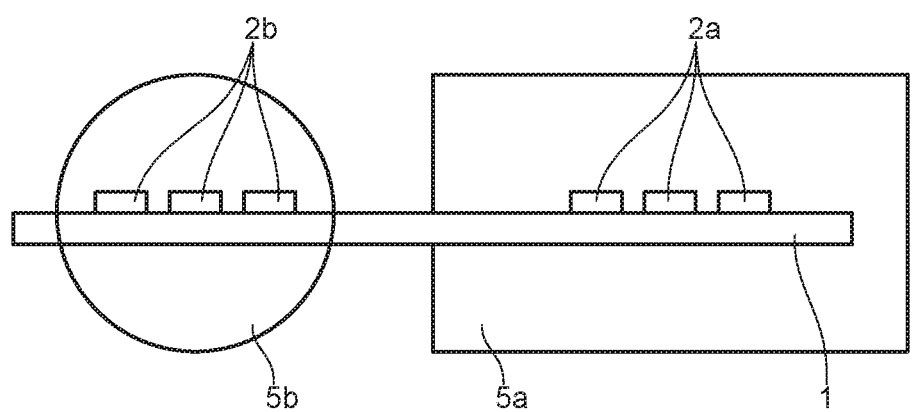
FIG. 11 is a diagram of the antenna apparatus according to Embodiment 2 as viewed from the back.
Figure 11:
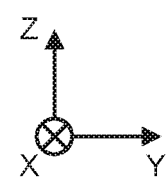

FIG. 10 is a plan view of antenna apparatus U according to the present embodiment. FIG. 11 is a diagram of antenna apparatus U according to the present embodiment as viewed from the back.

First dielectric lens 5a according to the embodiment is formed of a lens having a semi-cylindrical shape at a front end portion. On the other hand, second dielectric lens 5b according to the embodiment is formed of a lens having a dome or revolution paraboloid shape at the front end portion.

The dielectric lens having the semi-cylindrical shape narrows the beam in only the ±Z direction whereas the dielectric lens having the dome or revolution paraboloid shape narrows the beam both in the ±Z direction and the ±Y direction. Therefore, the dielectric lens having the dome or revolution paraboloid shape is more useful than the dielectric lens having the semi-cylindrical shape in that it can further narrow the beam of an electromagnetic wave.

Also in antenna apparatus U according to the embodiment, it is desirable that the difference between the forward protrusion amount of the front end face of first dielectric lens 5a and the forward protrusion amount of the front end face of second dielectric lens 5b (that is, the difference between first inter-end face distance D1 and second inter-end face distance D2) is approximately $\lambda/4\times(2m-1)$ so that re-reflected wave Fb1 and re-reflected wave Fb2 cancel each other. FIG. 10 indicates an aspect in which the forward protrusion amount of the front end face of first dielectric lens 5a is larger than the forward protrusion amount of the front end face of second dielectric lens 5b by $\lambda/4$.

As in the embodiment, however, when lenses having different shapes are used for first dielectric lens 5a and second dielectric lens 5b, the difference between first inter-end face distance D1 and second inter-end face distance D2 is set to approximately $\lambda/4\times(2m-1)$ on the basis of average protrusion positions of the corresponding lenses For example, since the front end face of the domed dielectric lens has a shape that is recessed in various directions than the front end face of the semi-cylindrical dielectric lens, even if distance from a peak of the front end face of the domed dielectric lens is the same as distance from a peak of the front end face of the semi-cylindrical dielectric lens, the average protrusion position of the front end face of the domed dielectric lens is a position closer to the base end side than the average protrusion position of the front end face of the semi-cylindrical dielectric lens (see the reference position of D2 in FIG. 10).

Figure 12:
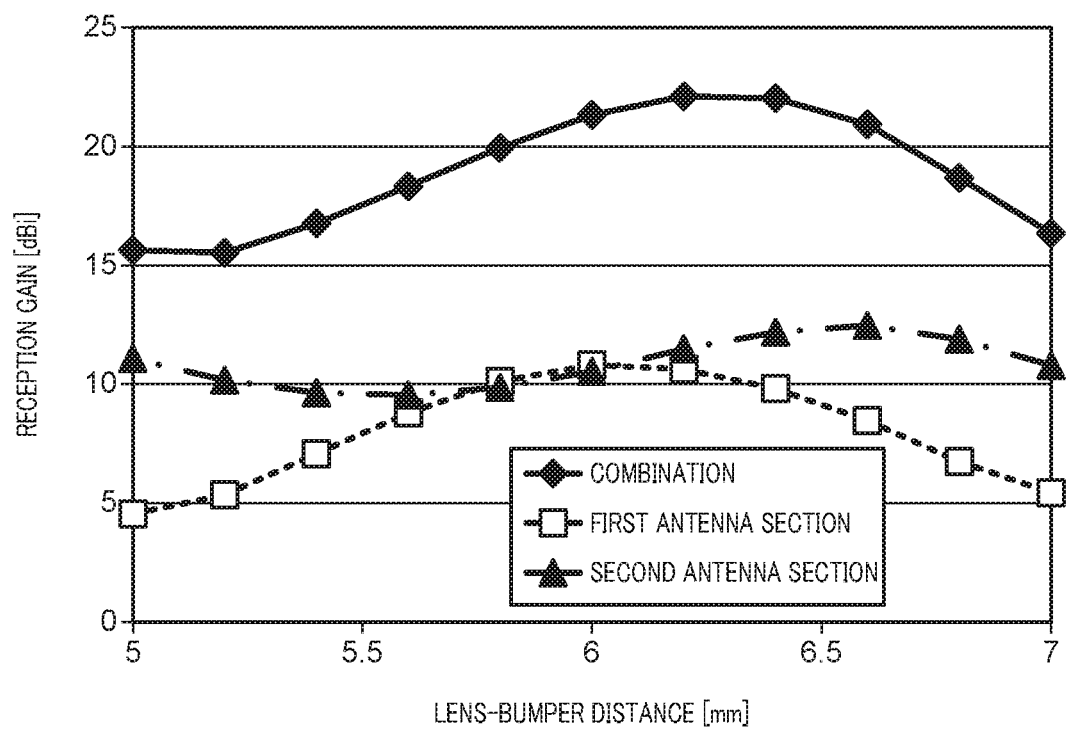
FIG. 12 illustrates a simulation result of verifying radar performance of the antenna apparatus according to Embodiment 2.

FIG. 12 illustrates a simulation result of verifying radar performance of antenna apparatus U according to the present embodiment in the same manner as FIG. 9A.

Lines in FIG. 12 represent the following:
dashed line: the reception gain at first antenna section 2a;
alternate long and short dash line: the reception gain at second antenna section 2b; and
solid line: the sum of the reception gain at first antenna section 2a and the reception gain at second antenna section 2b.

As can be seen from FIG. 12, also in antenna apparatus U according to the embodiment, even if the distance between cover member B and antenna apparatus U changes, the whole reception gain of first antenna section 2a and second antenna section 2b is substantially a constant reception gain (solid line in FIG. 12A). That is, antenna apparatus U according to the embodiment also can suppress the situation in which the accuracy of object detection is excessively deteriorated even if antenna apparatus U is displaced, in the same manner as antenna apparatus U according to Embodiment 1.

Figure 13A:
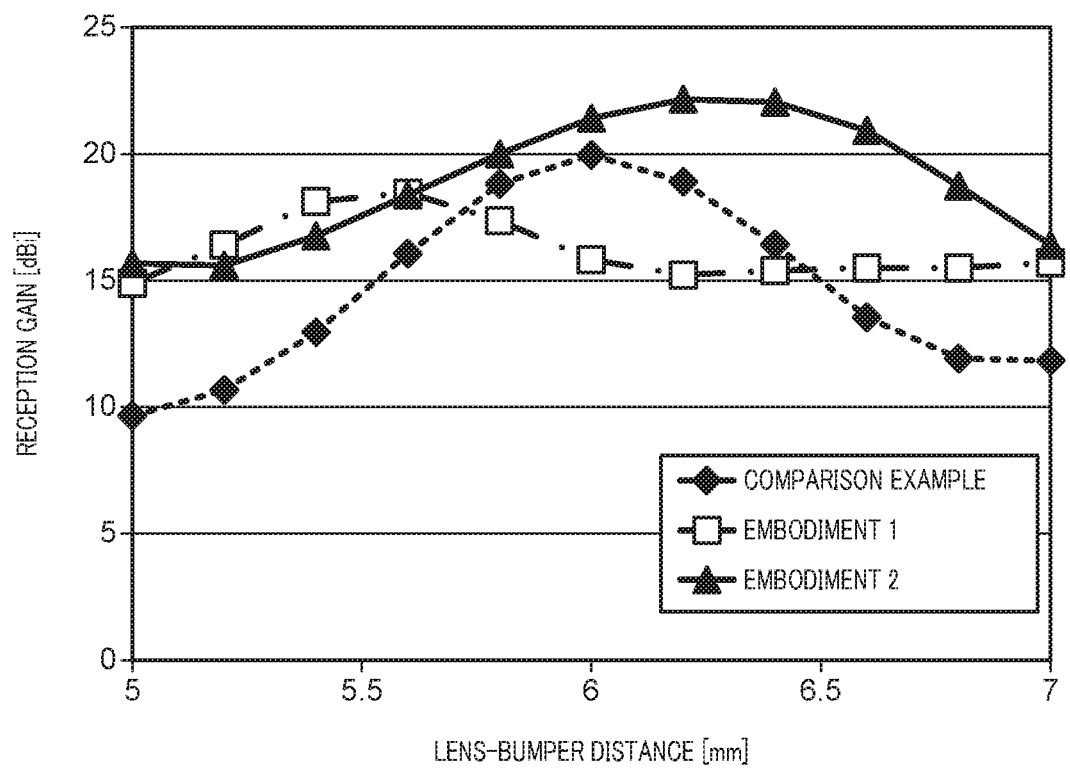
FIG. 13A illustrates comparison of reception gains of the antenna apparatus according to the comparison example, the antenna apparatus according to Embodiment 1, and the antenna apparatus according to Embodiment 2.
Figure 13B:
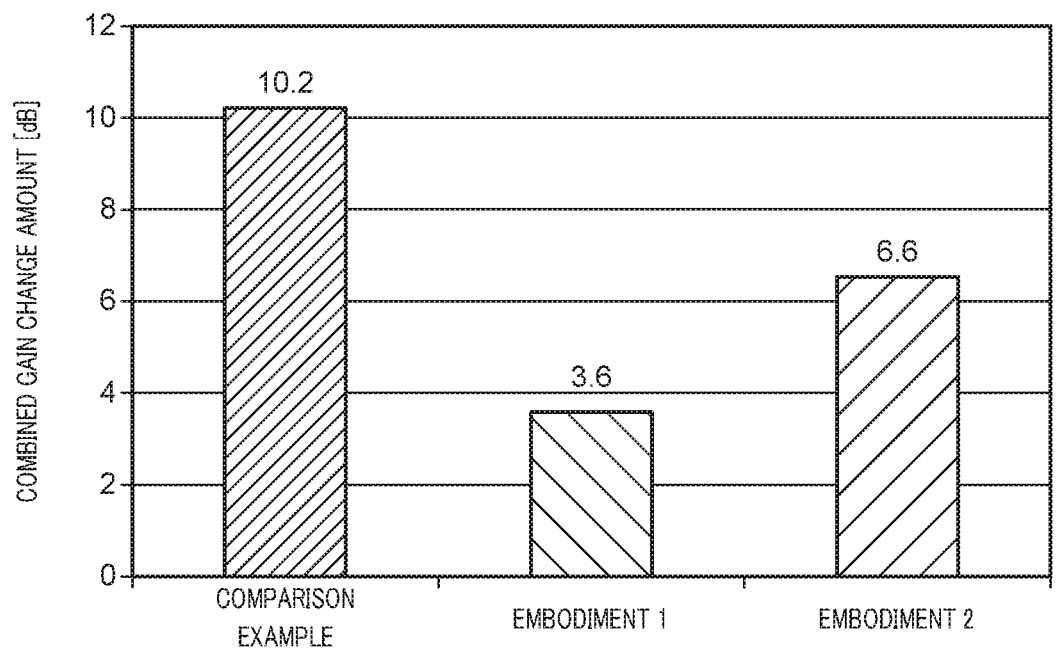
FIG. 13B illustrates comparison of reception gains of the antenna apparatus according to the comparison example, the antenna apparatus according to Embodiment 1, and the antenna apparatus according to Embodiment 2.

FIGS. 13A and 13B illustrate comparison of reception gains of antenna apparatus Ua according to the comparison example (see FIG. 7), antenna apparatus U according to Embodiment 1, and antenna apparatus U according to Embodiment 2.

FIG. 13A shows reception gains (here, combined gains obtained by summing the reception gain of first antenna section 2a and the reception gain of second antenna section 2b) when the distances between cover member B and the front end faces of antenna apparatuses U and Ua are changed for each of the distances. FIG. 13B shows amounts of change in the combined gains when the distances between cover member B and the front end faces of antenna apparatuses U and Ua are changed.

Lines in FIG. 13A represent the following:
dashed line: the reception gain at antenna apparatus Ua according to the comparison example;
alternate long and short dash line: the reception gain at antenna apparatus U according to Embodiment 1; and
solid line: the reception gain at antenna apparatus U according to Embodiment 2.

As can be seen from FIGS. 13A and 13B, in antenna apparatus U according to Embodiment 1 and antenna apparatus U according to Embodiment 2, even if antenna apparatus U is displaced, the amounts of change in reception gain are decreased in comparison with antenna apparatus Ua according to the comparison example. That is, antenna apparatus U according to Embodiment 1 and antenna apparatus U according to Embodiment 2 can reduce amounts of change in output gain even if antenna apparatus U is displaced, unlike antenna apparatus Ua according to the comparison example. As a result, it is possible to suppress the situation in which the accuracy of object detection excessively deteriorates.

As described above, like antenna apparatus U according to the present embodiment, even if the lens shape of first dielectric lens 5a and the lens shape of second dielectric lens 5b are different from each other, it is possible to suppress the situation in which the output gain and reception gain are decreased due to re-reflected waves Fb1 and Fb2 by setting first dielectric lens 5a and second dielectric lens 5b so that first inter-end face distance D1 and second inter-end face distance D2 are different from each other.

In antenna apparatus U according to the present embodiment, however, since the amount of change in reception gain when the distance between cover member B and antenna apparatus U changes is larger than that of antenna apparatus U according to Embodiment 1, antenna apparatus U according to Embodiment 1 is more suitable.

Embodiment 3

Next, antenna apparatus U according to Embodiment 3 will be described with reference to FIGS. 14 and 15.

Antenna apparatus U according to the present embodiment is different from Embodiment 1 in including third antenna section 2c and third dielectric lens 5c.

Figure 14:
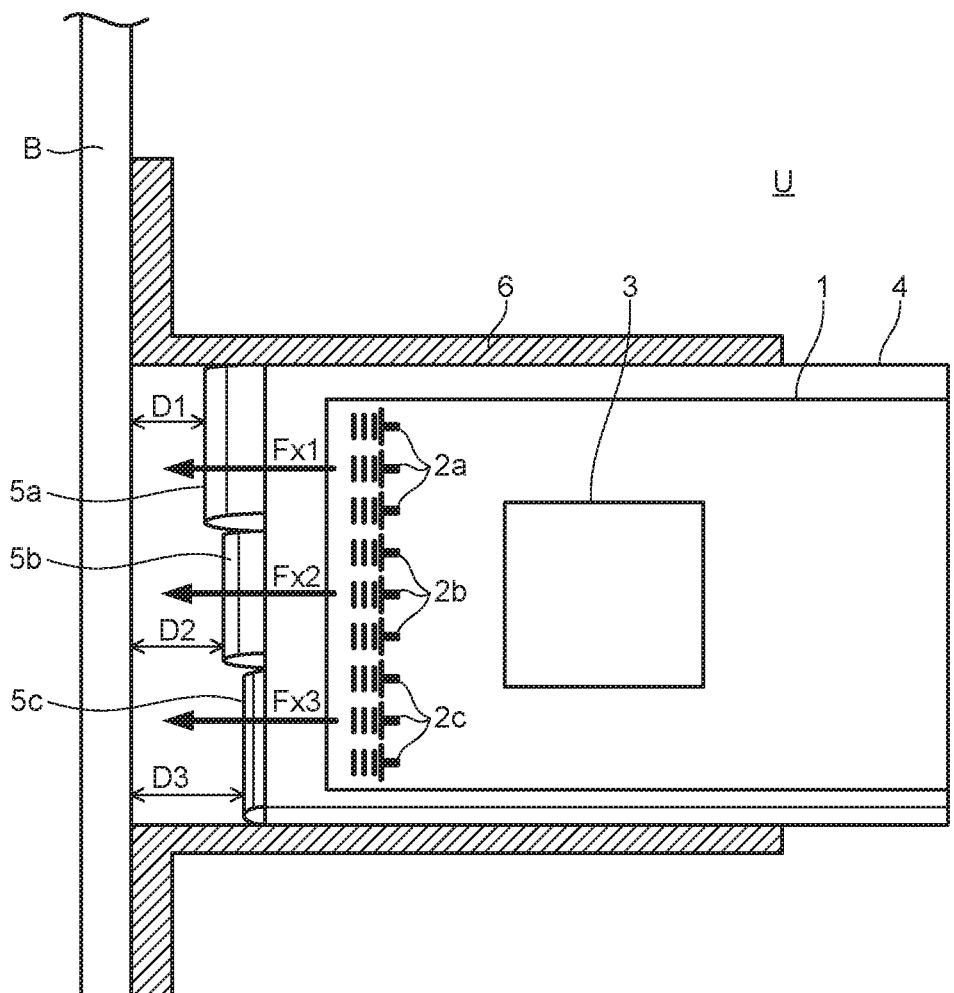
FIG. 14 is a plan view of an antenna apparatus according to Embodiment 3.

FIG. 14 is a plan view of antenna apparatus U according to the present embodiment.

Figure 15:
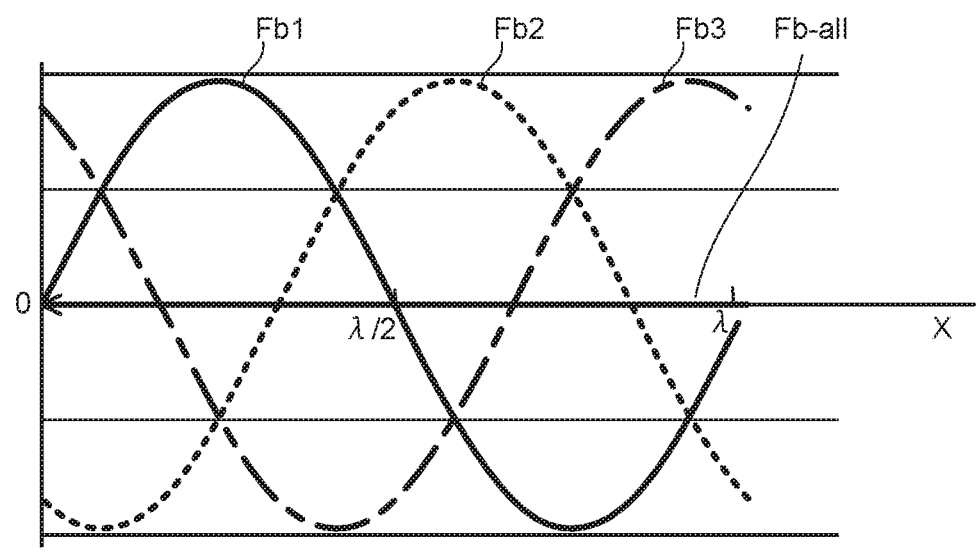
FIG. 15 is a graph showing amplitudes of re-reflected waves in the antenna apparatus according to Embodiment 3 with respect to the position of the antenna apparatus.

FIG. 15 is a graph showing amplitude of a re-reflected wave in antenna apparatus U according to the present embodiment with respect to the position of antenna apparatus U (the position in X axis direction). Lines in FIG. 15 represent the following:

Fb1: the amplitude of a re-reflected wave due to electromagnetic wave Fx1 transmitted from first antenna section 2a;

Fb2: the amplitude of a re-reflected wave due to electromagnetic wave Fx2 transmitted from second antenna section 2b;

Fb3: the amplitude of a re-reflected wave due to electromagnetic wave Fx3 transmitted from third antenna section 2c; and Fb-all: the combination of re-reflected wave Fb1, re-reflected wave Fb2, and re-reflected wave Fb3.

Third antenna section 2c is disposed adjacently on the minus Y direction side to second antenna section 2b in circuit board 1, transmits electromagnetic wave Fx3 forward, and receives reflected waves from forward which are electromagnetic waves Fx1, Fx2, and Fx3 reflected and returned by the target. Third antenna section 2c is composed of three end-fire array antennas disposed along the ±Y direction like first antenna section 2a and second antenna section 2b.

Third antenna section 2c is configured to execute the same operation as first antenna section 2a and second antenna section 2b. That is, first antenna section 2a, second antenna section 2b, and third antenna section 2c transmit electromagnetic waves Fx1, Fx2, and Fx3 having the same frequency and the same phase to the front of the apparatus outside. Then, first antenna section 2a, second antenna section 2b, and third antenna section 2c each receive reflected waves which are electromagnetic waves Fx1, Fx2, and Fx3 reflected and returned by the target.

Third dielectric lens 5c is supported in front of third antenna section 2c, narrows a beam of electromagnetic wave Fx3 transmitted by third antenna section 2c, and transmits to a front area of the apparatus outside. Then, third dielectric lens 5c focuses the reflected waves which are electromagnetic waves Fx1, Fx2, and Fx3 transmitted to the apparatus outside and returned from the target on third antenna section 2c.

In antenna apparatus U according to the present embodiment, adjustment of the protrusion amount of the front end face of each of first dielectric lens 5a, second dielectric lens 5b, and third dielectric lens 5c provides canceling action of re-reflected waves Fb1, Fb2, and Fb3 generated when electromagnetic waves Fx1, Fx2, and Fx3 are reflected by cover member B and reflected again by the front end faces of first dielectric lens 5a, second dielectric lens 5b, and third dielectric lens 5c, respectively.

Specifically, the protrusion amounts of the front end faces of first dielectric lens 5a, second dielectric lens 5b, and third dielectric lens 5c are, for example, different from each other by approximately $\lambda/6$. For example, the protrusion amount of the front end face of second dielectric lens 5b is larger than the protrusion amount of the front end face of third dielectric lens 5c by $\lambda/6$, and the protrusion amount of the front end face of first dielectric lens 5a is larger than the protrusion amount of the front end face of third dielectric lens 5c by $2\times\lambda/6$. In other words, distance D2 with respect to cover member B disposed in front of the front end face of second dielectric lens 5b is smaller than distance D3 with respect to cover member B disposed in front of the front end face of third dielectric lens 5c by $\lambda/6$, and distance D1 with respect to cover member B disposed in front of the front end face of first dielectric lens 5a is smaller than distance D3 with respect to cover member B disposed in front of the front end face of third dielectric lens 5c by $2\times\lambda/6$.

This allows re-reflected wave Fb1 due to electromagnetic wave Fx1 transmitted from first antenna section 2a, re-reflected wave Fb2 due to electromagnetic wave Fx2 transmitted from second antenna section 2b, and re-reflected wave Fb3 due to electromagnetic wave Fx3 transmitted from third antenna section 2c to act to cancel each other regardless of the position of antenna apparatus U, as shown in FIG. 15.

In the above embodiment, the aspect in which three sets each including an antenna section and a dielectric lens are disposed adjacently along the ±Y direction is shown, but the present invention is also applicable to antenna apparatus U including n (n is an arbitrary positive integer) antenna sections disposed adjacently along the ±Y direction and transmitting electromagnetic waves forward and n dielectric lenses disposed in front of the respective n antenna sections, narrowing beams of the electromagnetic waves transmitted by the n respective antenna sections, and transmitting to the apparatus outside.

In that case, forward protrusion amounts of the front end faces of the n respective dielectric lenses may be set so as to be different from each other by approximately $\lambda\times(2m-1)/(n\times2)$. In other words, distances with respect to cover member B disposed in front of the front end faces of the n respective dielectric lenses may be set to be different from each other by approximately $\lambda\times(2m-1)/(n\times2)$. For example, in an aspect in which four sets each including an antenna section and a dielectric lens are disposed, forward protrusion amounts of the front end faces of the four respective dielectric lenses is set to be different by approximately $\lambda/8$. In addition, in an aspect in which five sets each including an antenna section and a dielectric lens are disposed, forward protrusion amounts of the front end faces of the five respective dielectric lenses are set to be different by approximately $\lambda/10$.

In other words, the outer end faces of the other n−1 dielectric lenses protrude from the outer end face of one of then dielectric lenses by approximately $2\times k\times(2m-1)/(n\times2)$ (k denotes each integer between 1 to n−1) in the predetermined direction, respectively, and protrusion amounts of the outer end faces of the other n−1 dielectric lenses in the predetermined direction relative to the outer end face of one of the n dielectric lenses are different from each other.

As described above, the number of sets each including an antenna section and a dielectric lens is arbitrary and forward protrusion amounts of the front end faces of the respective dielectric lenses may be set according to the number of sets. This allows re-reflected waves to act to cancel each other regardless of the position of antenna apparatus U.

Embodiment 4

Next, antenna apparatus U according to Embodiment 4 will be described with reference to FIG. 16. Antenna apparatus U according to the present embodiment is different from Embodiment 2 in that only first antenna section 2a functions as a reception antenna.

Figure 16:
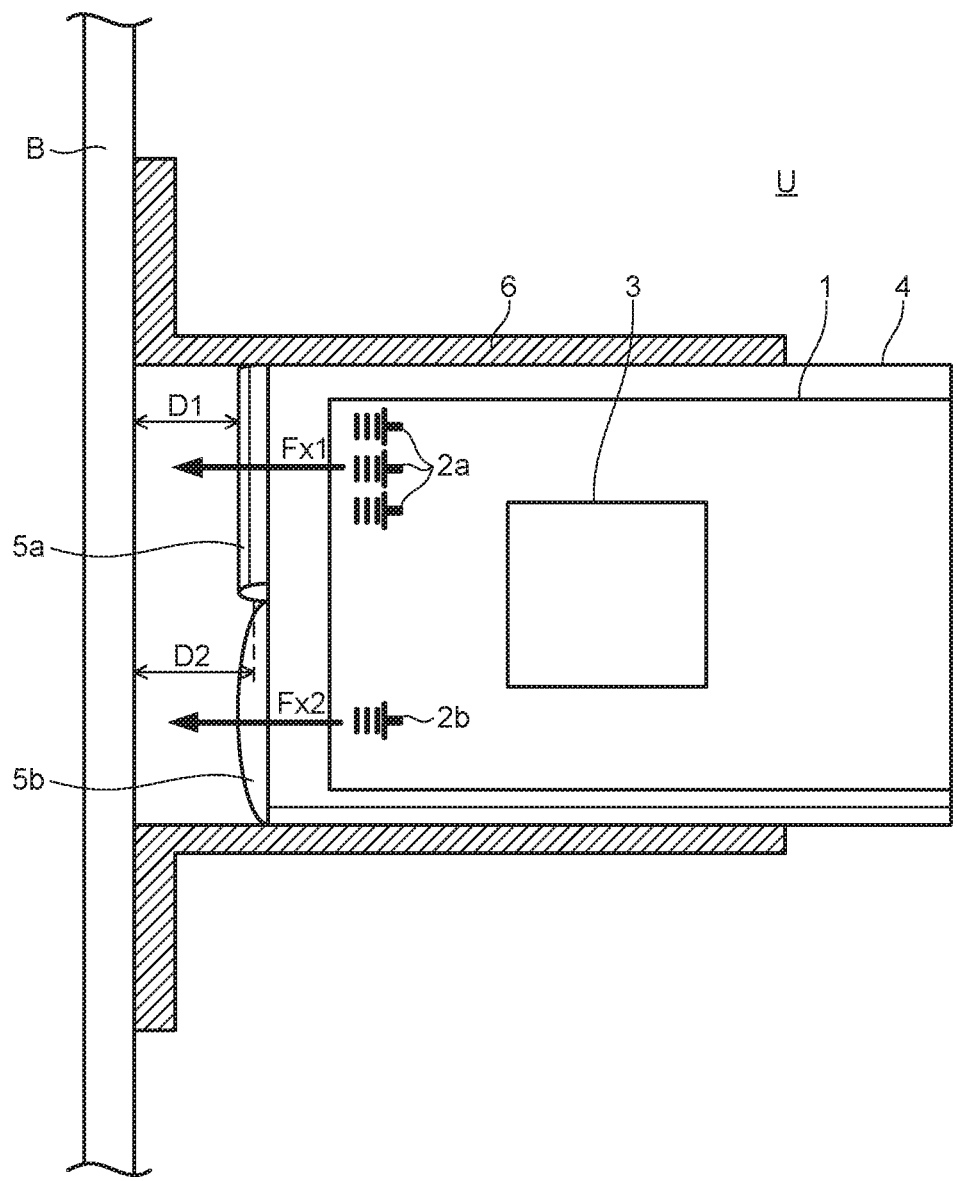
FIG. 16 is a plan view of an antenna apparatus according to Embodiment 4.

FIG. 16 is a plan view of antenna apparatus U according to the present embodiment.

Second antenna section 2b transmits electromagnetic wave Fx2 forward of the apparatus outside via second dielectric lens 5b. However, second antenna section 2b according to the present embodiment only transmits electromagnetic wave Fx2 but does not perform reception processing. Electromagnetic wave Fx2 transmitted to the apparatus outside is reflected by the target and detected by first antenna section 2a. That is, second antenna section 2b functions as an auxiliary antenna for increasing the output gain of the electromagnetic wave at first antenna section 2a.

As described above, when electromagnetic waves Fx1 and Fx2 are transmitted to the apparatus outside, antenna apparatus U according to the embodiment also allows "re-reflected wave Fb1 generated when electromagnetic wave Fx1 transmitted from first antenna section 2a is reflected by cover member B, is reflected again by first dielectric lens 5a, and travels to the apparatus outside" and "re-reflected wave Fb2 generated when electromagnetic wave Fx2 transmitted from second antenna section 2b is reflected by cover member B, is reflected again by second dielectric lens 5b, and travels to the apparatus outside" to act to cancel each other.

Embodiment 5

Next, antenna apparatus U according to Embodiment 5 will be described with reference to FIGS. 17, 18A, and 18B. Antenna apparatus U according to the present embodiment is different from Embodiment 2 in that dielectric lenses having different lens diameters are used for first dielectric lens 5a and second dielectric lens 5b.

Figure 17:
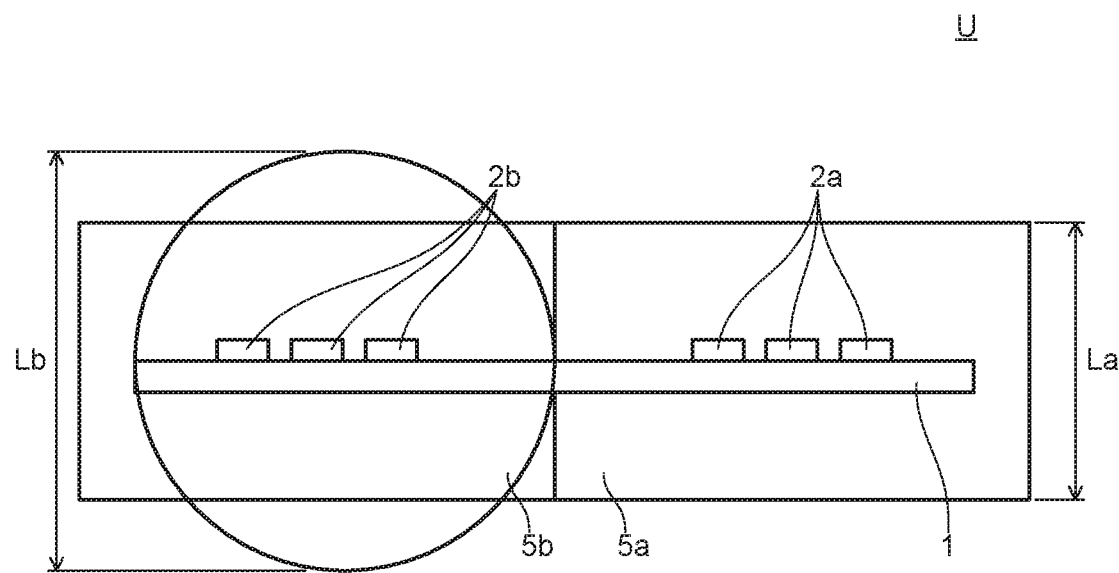
FIG. 17 is a diagram of an antenna apparatus according to Embodiment 5 as viewed from the back.
Figure 17:
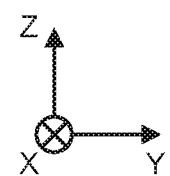

FIG. 17 is a diagram of antenna apparatus U according to the present embodiment as viewed from the back.

Figure 18A:
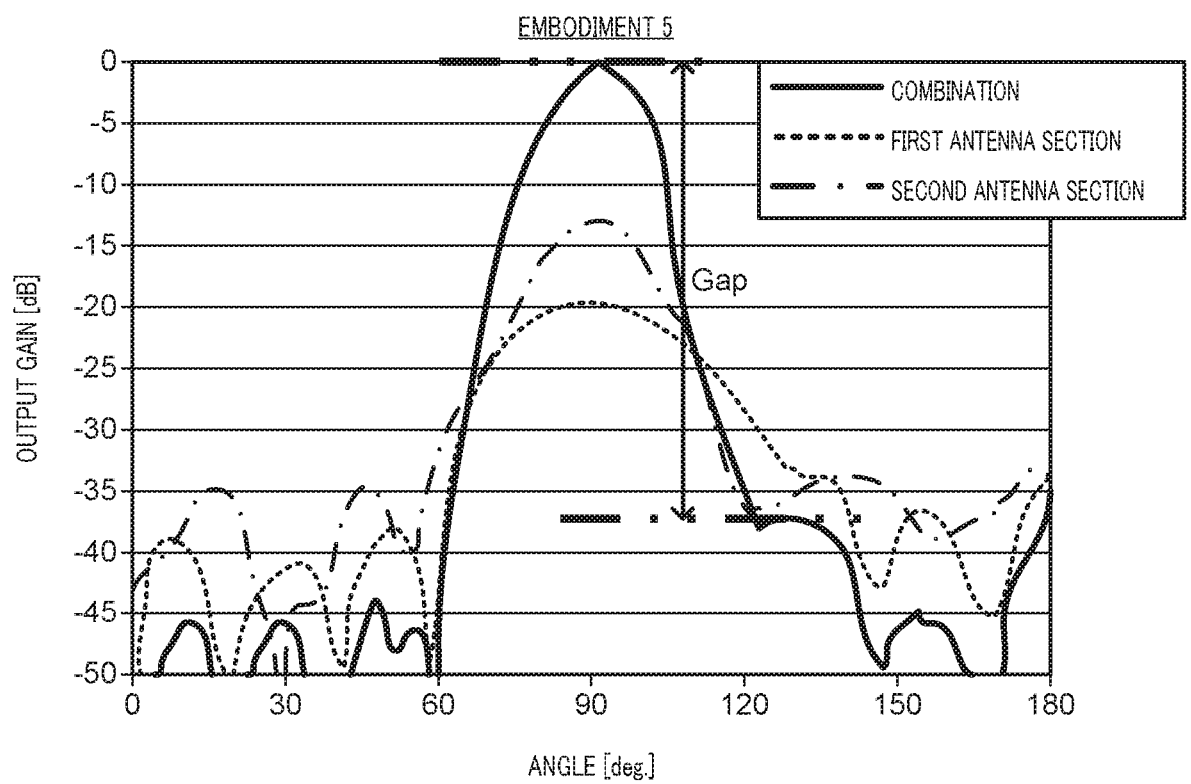
FIG. 18A is a graph illustrating an output characteristic according to a radiation direction of the antenna apparatus according to Embodiment 5.
Figure 18B:
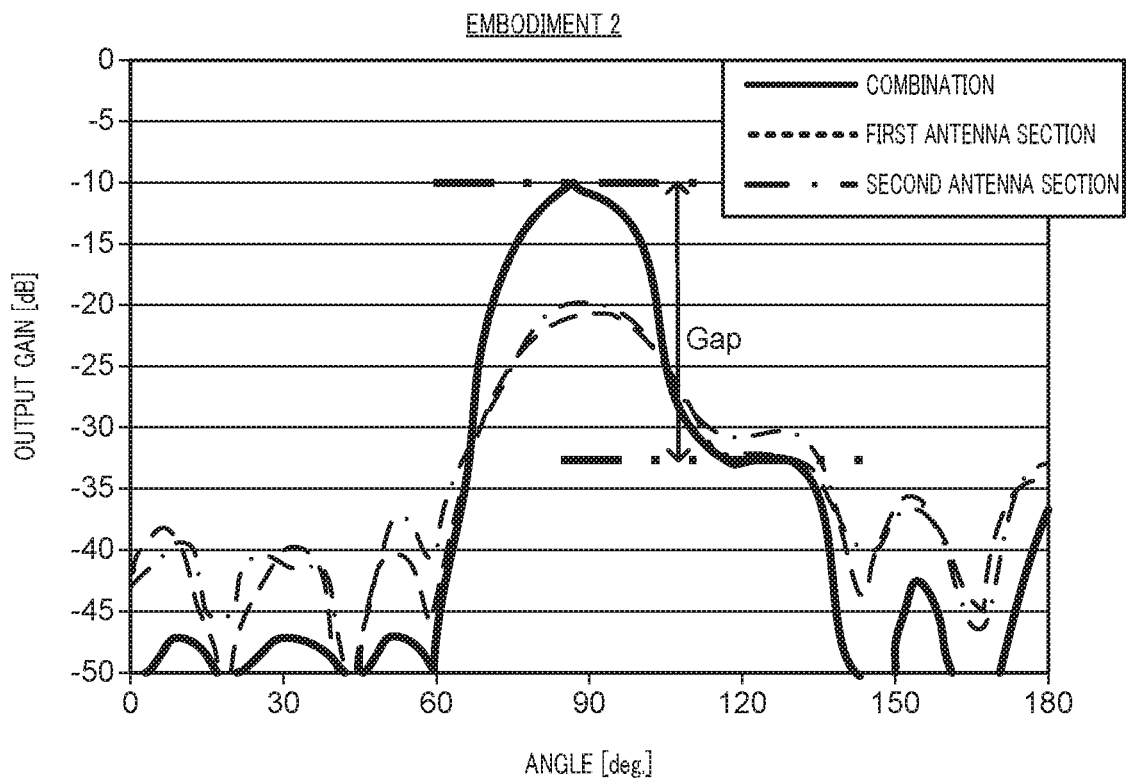
FIG. 18B is a graph illustrating an output characteristic according to the radiation direction of the antenna apparatus according to Embodiment 2.

FIG. 18A is a graph illustrating an output characteristic of antenna apparatus U according to the present embodiment, and FIG. 18B is a graph illustrating an output characteristic of antenna apparatus U according to Embodiment 2.

Lines in FIGS. 18A and 18B represent the following:
dashed line: the output gain at first antenna section 2a;
alternate long and short dash line: the output gain at second antenna section 2b; and
solid line: the sum of the output gain at first antenna section 2a and the output gain at second antenna section 2b.

In FIGS. 18A and 18B, the horizontal axis represents a radiation angle and the vertical axis represents the output gain. In FIGS. 18A and 18B, a position at a radiation angle of 90 degrees represents a direction to transmit electromagnetic wave from the antenna section (first antenna section 2a or second antenna section 2b). A region from approximately 60 degrees to 120 degrees corresponds to a main lobe of the electromagnetic wave transmitted from the antenna section (first antenna section 2a or second antenna section 2b) and regions from approximately 0 degrees to 60 degrees and from approximately 120 degrees to 180 degrees correspond to side lobes of the electromagnetic wave transmitted from the antenna section (first antenna section 2a or second antenna section 2b).

In FIGS. 18A and 18B, the magnitude of difference between the output gain of the main lobe and the output gain of the side lobes (width of Gap in FIGS. 18A and 18B) of the combined gain (solid line) represents a side lobe level as the whole antenna apparatus U.

Generally, the output gain of a dielectric lens changes according to the radiation direction from the dielectric lens. The output characteristic according to the radiation direction of the dielectric lens depends on the lens diameter of the dielectric lens. That is, when two dielectric lenses are used, it is possible to shift radiation directions in which the respective output gains are reduced by using dielectric lenses having different lens diameters from each other.

In the present embodiment, from this viewpoint, as second dielectric lens 5b, a dielectric lens having a larger lens diameter than first dielectric lens 5a is used (for example, lens diameter Lb of second dielectric lens 5b is 15 mm and lens diameter La of first dielectric lens 5a is 10 mm). In the embodiment, a semi-cylindrical lens is applied as first dielectric lens 5a and a domed lens is applied as second dielectric lens 5b, lenses having the same shape may be applied for first dielectric lens 5a and second dielectric lens 5b.

As can be seen from FIG. 18B, if the lens diameter of first dielectric lens 5a and the lens diameter of second dielectric lens 5b are the same size, first antenna section 2a and second antenna section 2b show the same output characteristic. Therefore, if the lens diameter of first dielectric lens 5a and the lens diameter of second dielectric lens 5b are the same size, a radiation angle where intensity of the side lobes of the electromagnetic wave transmitted by first antenna section 2a increases overlaps with a radiation angle where intensity of the side lobes of the electromagnetic wave transmitted by second antenna section 2b increases. Because of this, as the combined gain, a radiation angle where the intensity of the side lobes with respect to the intensity of the main lobe is abnormally large occurs. As a result, there is a risk of inducing a situation in which a reflected wave (for example, a reflected wave from the ground) generated due to the side lobes is falsely detected as a reflected wave from the target.

On the other hand, as can be seen from FIG. 18A, if the lens diameter of first dielectric lens 5a and the lens diameter of second dielectric lens 5b are different sizes, the radiation angle where intensity of the side lobes of the electromagnetic wave transmitted by first antenna section 2a increases is deviated from the radiation angle where intensity of the side lobes of the electromagnetic wave transmitted by second antenna section 2b increases. Consequently, as the combined gain of those, the intensity of the side lobes with respect to the intensity of the main lobe is relatively small for each direction. As a result, the risk of the occurrence of false detection due to the side lobes is also decreased.

As described above, according to antenna apparatus U according to the embodiment, it is possible to suppress the occurrence of false detection due to the side lobes.

Embodiment 6

In the above embodiments, the radar apparatus has been described as an application target of antenna apparatus U, but antenna apparatus U according to the present invention can be also applied to communication applications.

Figure 19:
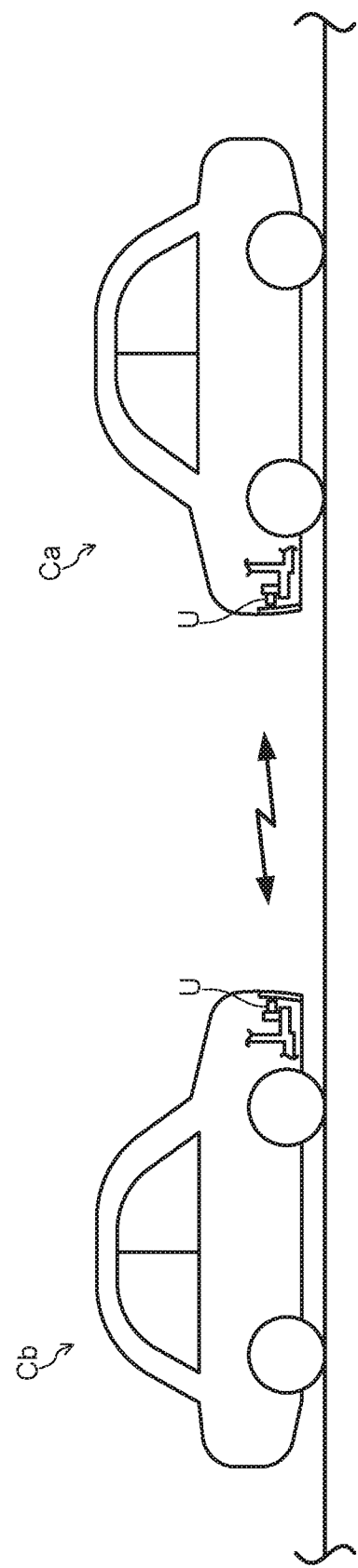
FIG. 19 illustrates an example of an antenna apparatus according to Embodiment 6.

FIG. 19 illustrates an example of antenna apparatus U according to Embodiment 6.

FIG. 19 shows a state in which electromagnetic waves are transmitted and received between antenna apparatus U mounted on one vehicle Ca and antenna apparatus U mounted on another vehicle Cb and communication is performed (so-called vehicle-to-vehicle communication). In antenna apparatus U according to the present embodiment, a signal processing IC for communication (not shown) may be mounted instead of above-described object detection signal processing IC 3.

Because antenna apparatus U according to the present invention can prevent the situation in which phases are canceled by multiple reflection with the cover (bumper) member and the output gain is decreased when electromagnetic waves are transmitted via cover member B, antenna apparatus U can be suitably used for an aspect to communicate with another antenna apparatus as in the embodiment.

Other Embodiments

The present invention is not limited to the above embodiments and various modifications can be considered. For example, it goes without saying that various combinations of the aspects shown in the embodiments may be used.

In the above embodiments, the semi-cylindrical lens or domed lens are shown as an example of the shapes of first dielectric lens 5a and second dielectric lens 5b. However, as the shapes of first dielectric lens 5a and second dielectric lens 5b, a double-sided convex lens, a ball lens, a Fresnel lens, or a combination thereof, or a concave lens and a combination thereof, or the like may be applied. In addition to those, as first dielectric lens 5a and second dielectric lens 5b, their rear surface side may be convex in the minus X direction. First dielectric lens 5a and second dielectric lens 5b may be integrally formed.

In the above embodiments, the end-fire array antenna is shown as an example of first antenna section 2a and second antenna section 2b. However, first antenna section 2a and second antenna section 2b may be any one that is formed by a conductor pattern formed on circuit board 1, and in addition to the end-fire array antenna, an antenna such as a Yagi array antenna, Fermi antenna, post wall waveguide antenna, or post wall horn antenna is also applicable.

In the above embodiments, as one example of the positional relationship between antenna apparatus U and cover member B, the aspect is shown in which cover member B extends along the direction (±Y direction) in which first antenna section 2a and second antenna section 2b of antenna apparatus U are adjacent to each other. However, antenna apparatus U may be mounted so as to incline against cover member B. In other words, the direction (±Y direction) in which first antenna section 2a and second antenna section 2b of antenna apparatus U are adjacent to each other may be inclined against the extending direction of cover member B. In the aspect, first inter-end face distance D1 may be set on the basis of the distance between cover member B in front of first dielectric lens 5a and the front end face of first dielectric lens 5a, and second inter-end face distance D2 may be set on the basis of the distance between cover member B in front of second dielectric lens 5b and the front end face of second dielectric lens 5b.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2018-165245, filed on Sep. 4, 2018, the disclosure of which including the specification, drawings and abstract is incorporated herein by reference in its entirety.

INDUSTRIAL APPLICABILITY

According to the antenna apparatus according to the present disclosure, it is possible to ensure a high output gain even when electromagnetic waves are transmitted and received via the cover member.

REFERENCE SIGNS LIST

U Antenna apparatus
B Cover member
C Vehicle
1 Circuit board
2a First antenna section
2b Second antenna section
2c Third antenna section
3 Signal processing IC
4 Housing
4a, 4b Window portion
5a First dielectric lens
5b Second dielectric lens
5c Third dielectric lens
6 Bracket

The invention claimed is:

1. An antenna apparatus for transmitting and receiving electromagnetic waves via a cover member disposed outside, the antenna apparatus comprising:
    first and second antenna sections that are disposed adjacently to each other along a direction orthogonal to a predetermined direction in which the electromagnetic waves are transmitted and that transmit the electromagnetic waves, respectively; and
    first and second dielectric lenses that are disposed in front of the first and second antenna sections in the predetermined direction, respectively, and that narrow beams of the electromagnetic waves transmitted by the first and the second antenna sections, respectively, and transmit the beams of the electromagnetic waves to an outside,
    wherein an outer end face of the first dielectric lens protrudes further forward in the predetermined direction than an outer end face of the second dielectric lens, and
    a distance D1 between the cover member and the outer end face of the first dielectric lens is shorter than a distance D2 between the cover member and the outer end face of the second dielectric lens.

2. The antenna apparatus according to claim 1,
    wherein the outer end faces of the first and second dielectric lenses each have a semi-cylindrical shape convex in the predetermined direction or a parabolic cylindrical shape convex in the predetermined direction.

3. The antenna apparatus according to claim 1,
    wherein any one of the first and the second dielectric lenses has an outer end face having a semi-cylindrical shape convex in the predetermined direction or a parabolic cylindrical shape convex in the predetermined direction, and the other has an outer end face having a dome shape convex in the predetermined direction or a revolution paraboloid shape convex in the predetermined direction.

4. An antenna apparatus for transmitting and receiving electromagnetic waves via a cover member disposed outside, the antenna apparatus comprising:
    first and second antenna sections that are disposed adjacently to each other along a direction orthogonal to a predetermined direction in which the electromagnetic waves are transmitted and that transmit the electromagnetic waves, respectively; and
    first and second dielectric lenses that are disposed in front of the first and second antenna sections in the predetermined direction, respectively, and that narrow beams of the electromagnetic waves transmitted by the first and the second antenna sections, respectively, and transmit the beams of the electromagnetic waves to an outside, wherein an outer end face of the first dielectric lens protrudes further forward in the predetermined direction than an outer end face of the second dielectric lens, and a difference between a protrusion amount to the predetermined direction of the outer end face of the first dielectric lens and a protrusion amount to the predetermined direction of the outer end face of the second dielectric lens is approximately $\lambda/4\times(2m-1)$, where $\lambda$ denotes a free space wavelength of the electromagnetic waves and m denotes an arbitrary positive integer.

5. An antenna apparatus for transmitting and receiving electromagnetic waves via a cover member disposed outside, the antenna apparatus comprising:

first and second antenna sections that are disposed adjacently to each other along a direction orthogonal to a predetermined direction in which the electromagnetic waves are transmitted and that transmit the electromagnetic waves, respectively; and first and second dielectric lenses that are disposed in front of the first and second antenna sections in the predetermined direction, respectively, and that narrow beams of the electromagnetic waves transmitted by the first and the second antenna sections, respectively, and transmit the beams of the electromagnetic waves to an outside, wherein an outer end face of the first dielectric lens protrudes further forward in the predetermined direction than an outer end face of the second dielectric lens, and a difference between a distance between the outer end face of the first dielectric lens and a surface facing the first dielectric lens of the cover member, and a distance between the outer end face of the second dielectric lens and a surface facing the second dielectric lens of the cover member is approximately $\lambda/4\times(2m-1)$, where $\lambda$ denotes a free space wavelength of the electromagnetic waves and m denotes an arbitrary positive integer.

6. The antenna apparatus according to claim 1, wherein a lens diameter of the first dielectric lens and a lens diameter of the second dielectric lens are different from each other.

7. The antenna apparatus according to claim 1, wherein the first and the second antenna sections are each comprising an end-fire array antenna disposed on a circuit board.

8. The antenna apparatus according to claim 7, wherein at least one of the first antenna section or the second antenna section is comprising a plurality of the end-fire array antennas disposed in an array along the direction orthogonal to the predetermined direction.

9. An antenna apparatus for transmitting and receiving electromagnetic waves via a cover member disposed outside, the antenna apparatus comprising:

first and second antenna sections that are disposed adjacently to each other along a direction orthogonal to a predetermined direction in which the electromagnetic waves are transmitted and that transmit the electromagnetic waves, respectively;

first and second dielectric lenses that are disposed in front of the first and second antenna sections in the predetermined direction, respectively, and that narrow beams of the electromagnetic waves transmitted by the first and the second antenna sections, respectively, and transmit the beams of the electromagnetic waves to an outside, n antenna sections that include the first and the second antenna sections are disposed adjacently along the direction orthogonal to the predetermined direction and that transmit the electromagnetic waves, respectively, where n is an arbitrary positive integer;

n dielectric lenses that include the first and the second dielectric lenses are disposed in front of the n antenna sections in the predetermined direction, respectively, and that narrow beams of the electromagnetic waves transmitted by the n antenna sections, respectively, and transmit the beams of the electromagnetic waves to the outside of the apparatus, wherein in an outer end face of the first dielectric lens protrudes further forward in the predetermined direction than an outer end face of the second dielectric lens, the outer end faces of the other n-1 dielectric lenses protrude from the outer end face of one of the n dielectric lenses by approximately $\lambda\times k\times(2m-1)/(n\times 2)$ in the predetermined direction, respectively, where $\lambda$ denotes a free space wavelength of the electromagnetic waves, k denotes each integer between 1 to n-1, and m denotes an arbitrary integer, and protrusion amounts of the outer end faces of the other n-1 dielectric lenses in the predetermined direction relative to the outer end face of one of the n dielectric lenses are different from each other.

10. The antenna apparatus according to claim 1, wherein at least one of the first antenna section or the second antenna section receives the electromagnetic wave from the predetermined direction returned after reflected by an object.

11. A radar apparatus, comprising the antenna apparatus according to claim 1.

* * * * *